(12) United States Patent
Wada et al.

(10) Patent No.: US 8,549,484 B2
(45) Date of Patent: Oct. 1, 2013

(54) CONFIGURATION INFORMATION VERIFICATION APPARATUS AND CONFIGURATION INFORMATION VERIFICATION METHOD

(75) Inventors: Yuji Wada, Kawasaki (JP); Akira Katsuno, Kawasaki (JP); Yasuhide Matsumoto, Kawasaki (JP); Yukihiro Watanabe, Kawasaki (JP); Kuniaki Shimada, Kawasaki (JP); Masazumi Matsubara, Kawasaki (JP); Hiroshi Otsuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 209 days.

(21) Appl. No.: 12/929,084

(22) Filed: Dec. 29, 2010

(65) Prior Publication Data

US 2011/0167411 A1 Jul. 7, 2011

(30) Foreign Application Priority Data

Jan. 4, 2010 (JP) ................................ 2010-000212

(51) Int. Cl.
| | |
|---|---|
| *G06F 11/30* | (2006.01) |
| *G06F 15/177* | (2006.01) |
| *G06F 15/173* | (2006.01) |
| *G06F 11/00* | (2006.01) |
| *G06F 9/44* | (2006.01) |
| *G06F 15/16* | (2006.01) |
| *G06F 12/14* | (2006.01) |

(52) U.S. Cl.
USPC ........... 717/126; 702/104; 702/182; 709/221; 709/223; 714/37; 717/124; 726/5; 726/22; 726/25

(58) Field of Classification Search
None
See application file for complete search history.

(56) References Cited

U.S. PATENT DOCUMENTS 7,013,395 B1 * 3/2006 Swiler et al. .................... 726/25

7,099,797 B1 * 8/2006 Richard ........................ 702/182

(Continued)

FOREIGN PATENT DOCUMENTS

| JP | 05-300239 | 11/1993 |
|---|---|---|
| JP | 2004-86729 | 3/2004 |

(Continued)

OTHER PUBLICATIONS

Chengjiong Wei et al., OSEK/VDX-Based Dynamic Network Management on Automotive Network, 2009, [Retrieved on May 14, 2013]. Retrieved from the internet: <URL: http://ieeexplore.ieee.org/stamp/stamp.jsp?tp=&arnumber=5066640> 7 Pages (131-137).*

(Continued)

*Primary Examiner* — Don Wong
*Assistant Examiner* — Anibal Rivera
(74) *Attorney, Agent, or Firm* — Staas & Halsey LLP

(57) ABSTRACT

A configuration information verification apparatus includes an alive monitoring information collecting unit for collecting alive monitoring information from a plurality of configuration items constituting a network, a logical formula creating unit for referring to configuration information that represents information about connection relationships between the configuration items and creating a logical formula with respect to each configuration item by performing an AND operation on configuration items positioned on a route leading to corresponding configuration item, and assigning a "true" value to the logical formula if the alive monitoring information indicates that the corresponding configuration item is operating normally and assigning a "false" to the logical formula if the alive monitoring information indicates that the corresponding configuration item is not operating normally; and a logical formula verifying unit for verifying, from a plurality of logical formulae, whether an inconsistent logical formula is present.

7 Claims, 31 Drawing Sheets

(56) References Cited

U.S. PATENT DOCUMENTS

| | | | |
|---|---|---|---|
| 7,603,705 B2 * | 10/2009 | Roy | 726/22 |
| 7,886,031 B1 * | 2/2011 | Taylor et al. | 709/221 |
| 8,145,737 B2 * | 3/2012 | Nedelcu et al. | 709/223 |
| 2002/0178380 A1 | 11/2002 | Wolf et al. | |
| 2006/0010426 A1 * | 1/2006 | Lewis et al. | 717/124 |
| 2008/0052026 A1 * | 2/2008 | Amidon et al. | 702/104 |
| 2008/0126439 A1 | 5/2008 | Kaminsky | |
| 2009/0307763 A1 * | 12/2009 | Rawlins et al. | 726/5 |
| 2011/0055636 A1 * | 3/2011 | DeHaan et al. | 714/37 |

FOREIGN PATENT DOCUMENTS

| | | |
|---|---|---|
| WO | 2006/117832 | 11/2006 |
| WO | 2010/071888 | 6/2010 |

OTHER PUBLICATIONS

British Search Report for corresponding British Patent Application No. GB1022083.8, dated Apr. 28, 2011.

Japanese Office Action for corresponding Japanese Patent Application No. 2010-000212, mailed Jun. 25, 2013, 6 pages.

* cited by examiner

CONFIGURATION INFORMATION VERIFICATION APPARATUS AND CONFIGURATION INFORMATION VERIFICATION METHOD

CROSS-REFERENCE TO RELATED APPLICATION(S)

This application is based upon and claims the benefit of priority of the prior Japanese Patent Application No. 2010-000212, filed on Jan. 4, 2010, the entire contents of which are incorporated herein by reference.

FIELD

The embodiments discussed herein are directed to a configuration information verification apparatus, a configuration information verification method, and a configuration information verification program.

BACKGROUND

Typically, in a network of a plurality of connected devices, network administration is carried out by creating and holding configuration information that represents information about the connection relationships between the devices functioning as configuration items. More particularly, in some cases, configuration information is created before establishing the network and then the devices are connected according to the configuration information. Meanwhile, a technology is also known for creating configuration information by obtaining information from the devices connected in an already-established network.

However, in a case when a network is not established according to the configuration information or in a case when modifications in a network are not reflected in the configuration information, the configuration information sometimes differs from the actual network configuration. When differences occur between a network and the configuration information, it is desirable to obtain the actual configuration from the network and update the configuration information accordingly (see, for example, Japanese Laid-open Patent Publication No. 2004-86729).

Typically, in order to obtain information for identifying the connection relationship from the devices functioning as configuration items of a network, authentication may be required to operate those devices. Moreover, administrator qualification may be required to operate the devices.

As a method for obtaining configuration information without performing authentication or without having administrator qualification, the operator can manually verify the actual network configuration. However, manually verifying the network requires a lot of time and efforts. Particularly, manual verification becomes difficult if the network has a complex configuration or if the network is extensive in scope.

SUMMARY

According to an aspect of an embodiment of the invention, a configuration information verification apparatus includes an alive monitoring information collecting unit for collecting alive monitoring information from a plurality of configuration items constituting a network, a logical formula creating unit for referring to configuration information that represents information about connection relationships between the configuration items of the network and creating a logical formula with respect to each configuration item by performing an AND operation on configuration items positioned on a route leading to corresponding configuration item, and assigning a "true" value to the logical formula if the alive monitoring information indicates that the corresponding configuration item is operating normally and assigning a "false" to the logical formula if the alive monitoring information indicates that the corresponding configuration item is not operating normally, and a logical formula verifying unit for verifying, from a plurality of logical formulae created by the logical formula creating unit with respect to the plurality of configuration items, whether an inconsistent logical formula is present.

According to another aspect of an embodiment of the invention, a configuration information verification method includes collecting alive monitoring information from a plurality of configuration items constituting a network, referring to configuration information that represents information about connection relationships between the configuration items of the network and creating a logical formula with respect to each configuration item by performing an AND operation on configuration items positioned on a route leading to corresponding configuration item, and assigning a "true" value to the logical formula if the alive monitoring information indicates that the corresponding configuration item is operating normally and assigning a "false" to the logical formula if the alive monitoring information indicates that the corresponding configuration item is not operating normally, and verifying, from a plurality of logical formulae created with respect to the plurality of configuration items, whether an inconsistent logical formula is present.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT(S)

Preferred embodiments of the present invention will be explained with reference to accompanying drawings. The present invention is not limited to these embodiments.

[a] First Embodiment

Figure 1:
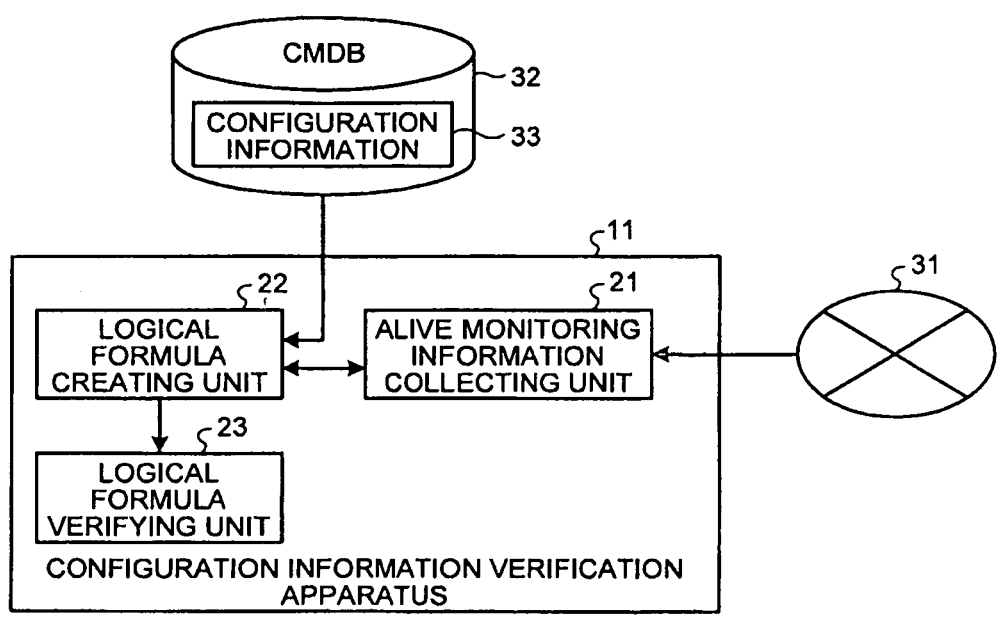
FIG. 1 is an outline configuration diagram of a configuration information verification apparatus according to a first embodiment of the present invention.

FIG. 1 is an outline configuration diagram of a configuration information verification apparatus 11 according to a first embodiment of the present invention. As illustrated in FIG. 1, the configuration information verification apparatus 11 is connected to a network 31 and a configuration management database (CMDB) 32. Herein, the CMDB 32 is used to hold configuration information 33 that represents information about configuration items of the network 31 and about connection relationships between those configuration items.

The configuration information verification apparatus 11 includes an alive monitoring information collecting unit 21, a logical formula creating unit 22, and a logical formula verifying unit 23. The alive monitoring information collecting unit 21 collects alive monitoring information that indicates which configuration items are in operation and which configuration items are not in operation from among the plurality of configuration items of the network 31.

The logical formula creating unit 22 refers to the configuration information 33 and, with respect to each configuration item, creates a logical formula by performing an AND operation on the configuration items positioned on the route leading to that configuration item. Then, as the value of each created logical formula, the logical formula creating unit 22 assigns "true" if the alive monitoring information indicates that the corresponding configuration item is operating normally and assigns "false" if the alive monitoring information indicates that the corresponding configuration item is not operating normally. The logical formula verifying unit 23 verifies whether any inconsistent logical formulae are present in the plurality of logical formulae created with respect to the plurality of configuration items by the logical formula creating unit 22.

Figure 2:
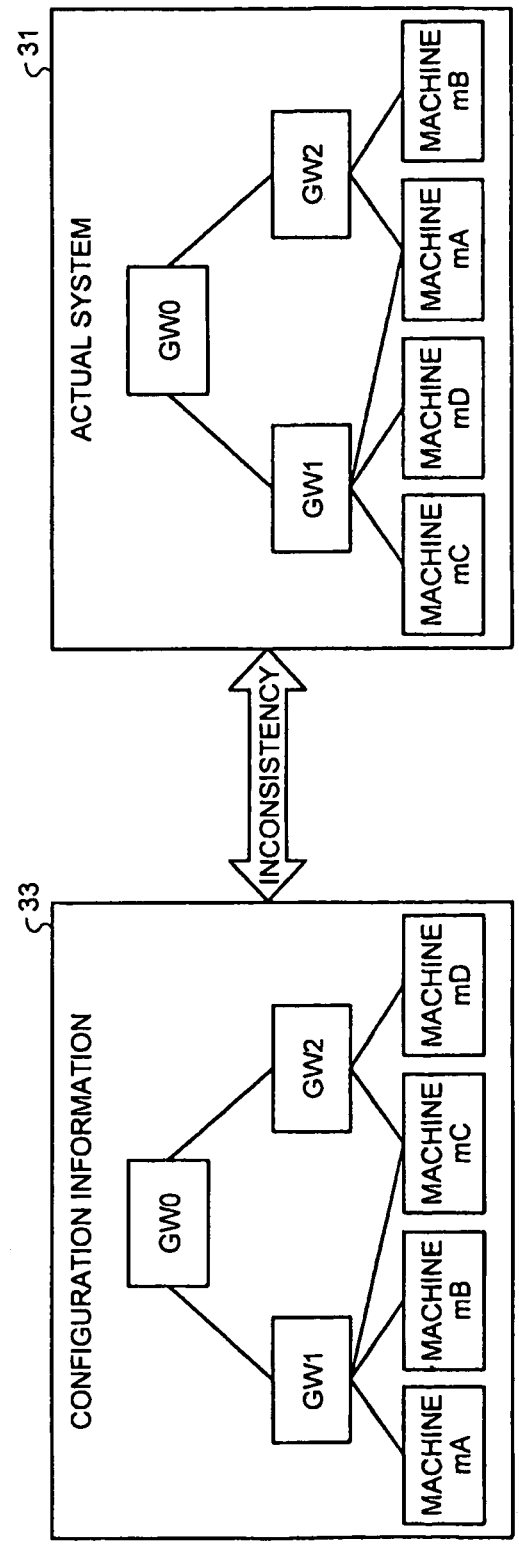
FIG. 2 is an explanatory diagram for explaining exemplary inconsistency between configuration information and a network.

FIG. 2 is an explanatory diagram for explaining exemplary inconsistency between the configuration information 33 and the network 31. In the example illustrated in FIG. 2, the configuration information 33 indicates that gateways GW1 and GW2 are connected to a gateway GW0; indicates that machines mA, mB, and mC are connected to the gateway GW1; and indicates that machines mC and mD are connected to the gateway GW2.

In contrast, in the actual system of the network 31, the gateways GW1 and GW2 are connected to the gateway GW0; the machines mC, mD, and mA are connected to the gateway GW1; and the machines mA and mB are connected to the gateway GW2. Thus, in the configuration information 33, the machines mA and mB are changed to the machines mC and mD, and vice versa. Hence, the configuration information 33 is not consistent with the actual system.

Figure 3:
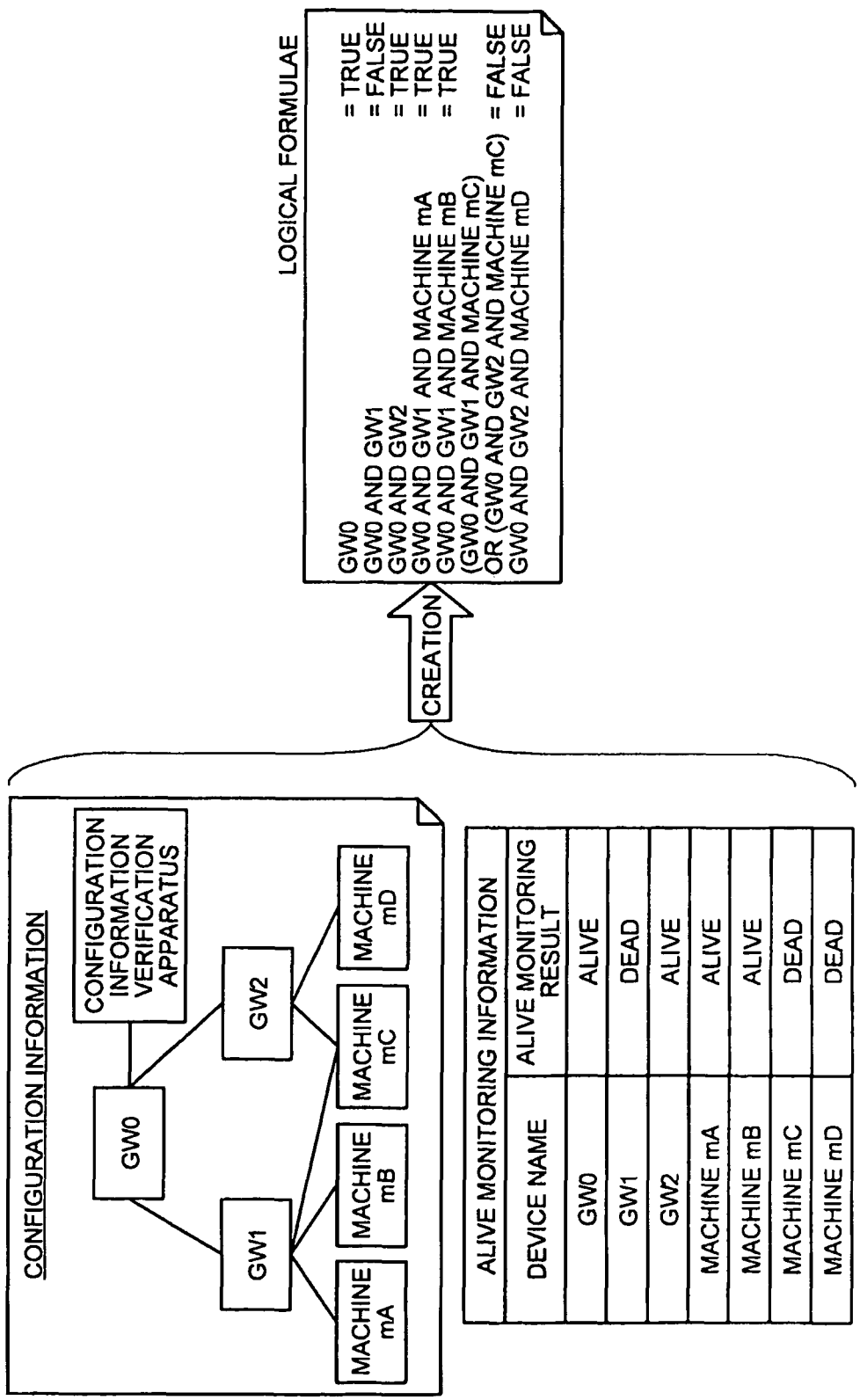
FIG. 3 is an explanatory diagram for explaining configuration information verification performed by the configuration information verification apparatus according to the first embodiment.

The configuration information verification apparatus 11 verifies whether the configuration information 33 is consistent with the actual system by making use of the alive monitoring information obtained from the network 31 and by making use of the configuration information 33. FIG. 3 is an explanatory diagram for explaining configuration information verification performed by the configuration information verification apparatus 11. Herein, the alive monitoring information can be obtained by, for example, issuing a ping command to each configuration item of the network. No authentication or administration qualification is required for issuing a ping command and receiving a response. Meanwhile, instead of issuing a ping command, it is also possible to issue an address resolution protocol (ARP) command or an rwho command for obtaining the alive monitoring information.

In the example illustrated in FIG. 3, as the alive monitoring result in the alive monitoring information, "alive" is assigned to the devices verified to be operating normally in response to a ping command and "dead" is assigned to the devices verified not to be operating normally in response to a ping command. More particularly, "alive" is assigned as the alive monitoring result of the gateway GW0, the gateway GW2, the machine mA, and the machine mB; while "dead" is assigned as the alive monitoring result of the gateway GW1, the machine mC, and the machine mD.

The configuration information verification apparatus 11 creates logical formulae by referring to the configuration information 33. FIG. 3 illustrates the case when the configuration information verification apparatus 11 is connected to the gateway GW0. With respect to each configuration item, the configuration information verification apparatus 11 performs an AND operation on the configuration items positioned on the route leading to that configuration item and, as the value of the logical formula, sets "true" if the alive monitoring result for that configuration item indicates "alive" but sets "false" if the alive monitoring result for that configuration item indicates "dead".

Regarding a configuration item that can be reached via a plurality of routes, the configuration information verification apparatus 11 creates a plurality of logical formulae by performing an AND operation on the configuration items positioned on each route leading to that particular configuration item and then obtains a single logical formula for that particular configuration item by performing an OR operation on the plurality of logical formulae.

Herein, following logical formulae are obtained from the configuration information 33.
GW0=true
GW0 AND GW1=false
GW0 AND GW2=true
GW0 AND GW1 AND machine mA=true
GW0 AND GW1 AND machine mB=true
(GW0 AND GW1 AND machine mC)
OR (GW0 AND GW2 AND machine mC)=false
GW0 AND GW2 AND machine mD=false Since "GW0=true", if "GW0" is substituted by "true" in the other formulae, then following logical formulae are obtained.
true AND GW1=false
true AND GW2=true
true AND GW1 AND machine mA=true
true AND GW1 AND machine mB=true
(true AND GW1 AND machine mC)
OR (true AND GW2 AND machine mC)=false
true AND GW2 AND machine mD=false As a result, "GW1=false" and "GW2=true".

If "GW1" and "GW2" are further substituted by "false" and "true", respectively; then following logical formulae are obtained.
false AND machine mA=true
false and machine mB=true
(false and machine mC)
or (true and machine mC)=false
true and machine mD=false Herein, "false AND machine mA=true" and "false and machine mB=true" are inconsistent logical formulae. When such inconsistent logical formulae are found to be present, the configuration information verification apparatus 11 determines that the configuration information 33 is not consistent with the configuration of the network 31.

As described above, the configuration information verification apparatus 11 according to the present embodiment creates a logical formula for each route leading to a particular configuration item and sets the values of the logical formula on the basis of the alive monitoring information obtained from the network 31. When any inconsistent logical formulae are found to be present, the configuration information verification apparatus 11 determines that the configuration information 33 is not consistent with the configuration of the network 31.

In this way, based on the alive monitoring information that does not require authentication or administration qualification, the configuration information verification apparatus 11 can easily confirm whether the configuration information is consistent with the actual network configuration.

[b] Second Embodiment

Figure 4:
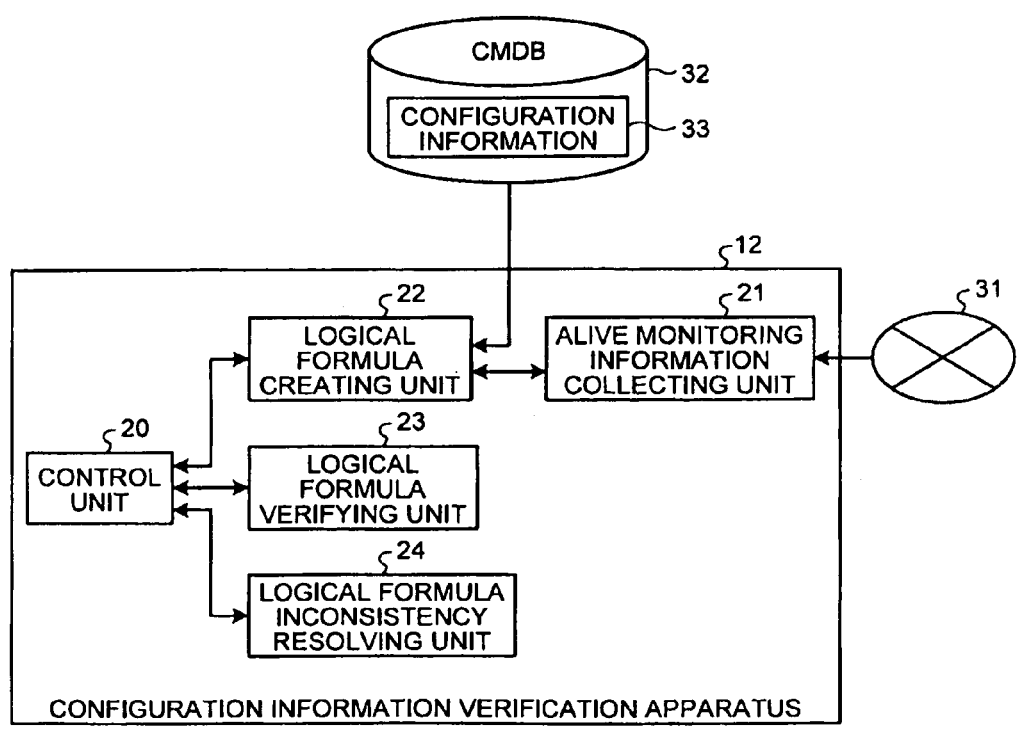
FIG. 4 is an outline configuration diagram of a configuration information verification apparatus according to a second embodiment of the present invention.

FIG. 4 is an outline configuration diagram of a configuration information verification apparatus 12 according to a second embodiment of the present invention. As illustrated in FIG. 4, the configuration information verification apparatus 12 is connected to the network 31 and the CMDB 32. Herein, the CMDB 32 is used to hold the configuration information 33 that represents information about configuration items of the network 31 and about connection relationships between those configuration items.

The configuration information verification apparatus 12 includes a control unit 20, the alive monitoring information collecting unit 21, the logical formula creating unit 22, the logical formula verifying unit 23, and a logical formula inconsistency resolving unit 24.

Figure 5:
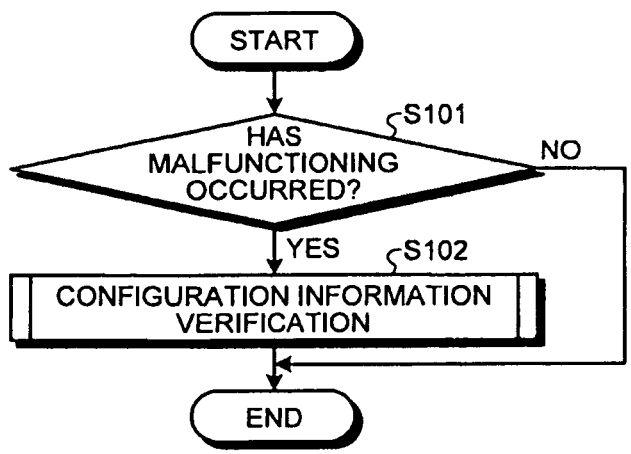
FIG. 5 is a flowchart for explaining the operations performed by the configuration information verification apparatus according to the second embodiment.

The control unit 20 controls the operations of the configuration information verification apparatus 12. FIG. 5 is a flowchart for explaining the operations performed by the configuration information verification apparatus 12. Herein, the configuration information verification apparatus 12 monitors for malfunctioning in the network 31 (Step S101). When malfunctioning occurs (Yes at Step S101), the control unit 20 performs a configuration information verification operation (Step S102). Apart from the case when malfunctioning is detected, the configuration information verification operation can also be started manually by the operator.

Figure 6:
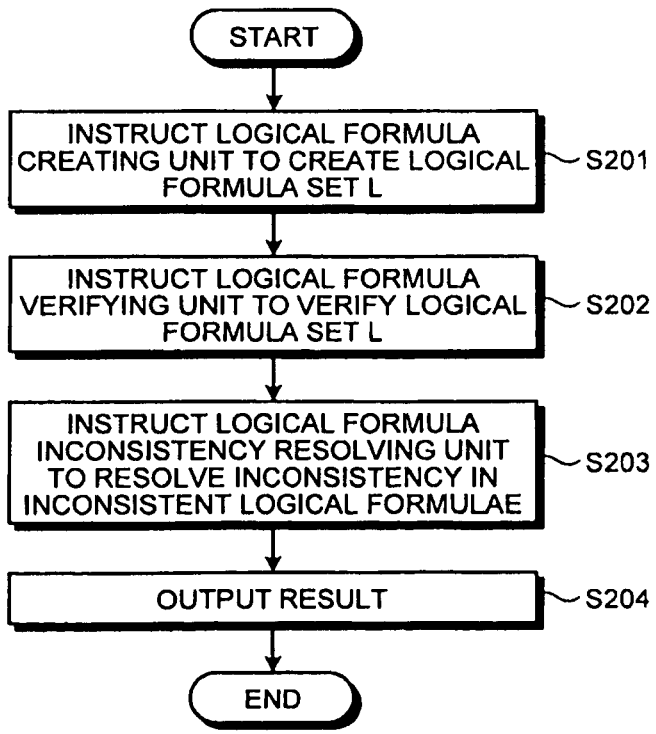
FIG. 6 is a flowchart for explaining the sequence in a configuration information verification operation performed by a control unit according to the second embodiment.

FIG. 6 is a flowchart for explaining the sequence in the configuration information verification operation performed by the control unit 20. Firstly, the control unit 20 instructs the logical formula creating unit 22 to create a logical formula set L (Step S201). Subsequently, the control unit sends the logical formula set L created by the logical formula creating unit 22 to the logical formula verifying unit 23 and instructs the logical formula verifying unit 23 to verify the logical formula set L (Step S202). Regarding the logical formulae that are determined to be inconsistent according to the verification result of the logical formula verifying unit 23, the control unit 20 instructs the logical formula inconsistency resolving unit 24 to resolve the inconsistency (Step S203) and outputs the result (Step S204) before ending the configuration information verification operation.

Figure 7:
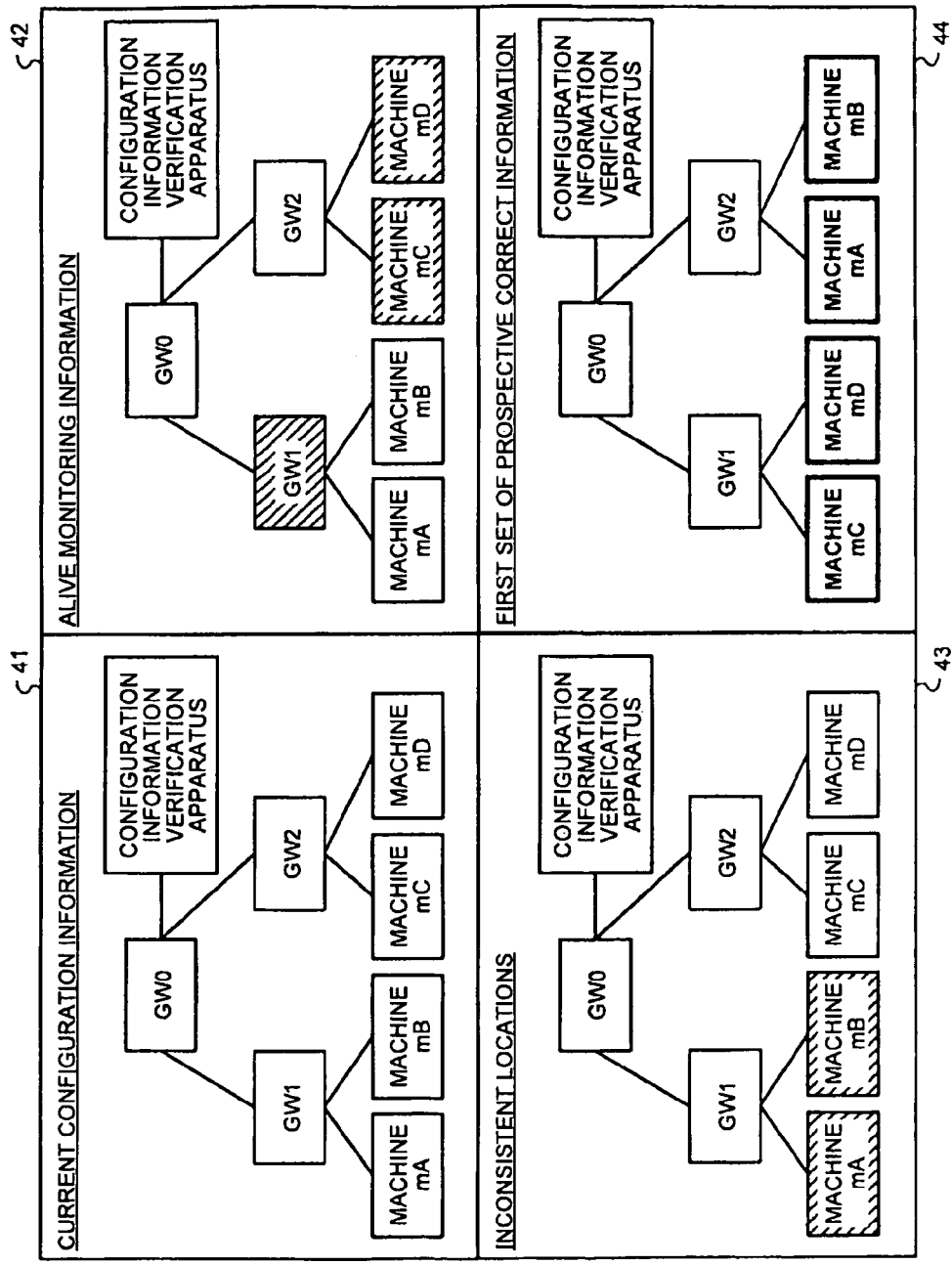
FIG. 7 illustrates an example of the output from the control unit according to the second embodiment.

FIG. 7 illustrates an example of the output from the control unit 20. The control unit 20 outputs a display 41 for displaying the current configuration information, display 42 for displaying the alive monitoring information obtained from the network 31, a display 43 for displaying the configuration information that is not consistent with the alive monitoring information obtained from the network 31, and a display 44 for displaying the prospective correct configuration information. Meanwhile, the displays 41 to 44 can be displayed either simultaneously or sequentially on a display device. Moreover, the display contents can be selected in response to a display switching operation performed by the user regarding the displays 41 to 44.

More particularly, in the display 43, the configuration items included in the inconsistent logical formulae is displayed in an identifiable manner from the other configuration items. The display 44 includes the prospective configuration information that can resolve the inconsistency in the logical formulae. More particularly, in the display 44, the locations at which modifications have been made are displayed in an identifiable manner from the current configuration information. When there exists more than one set of the prospective configuration information that can resolve the inconsistency in the logical formulae, it is desirable to make each set of the prospective configuration information viewable.

Figure 8:
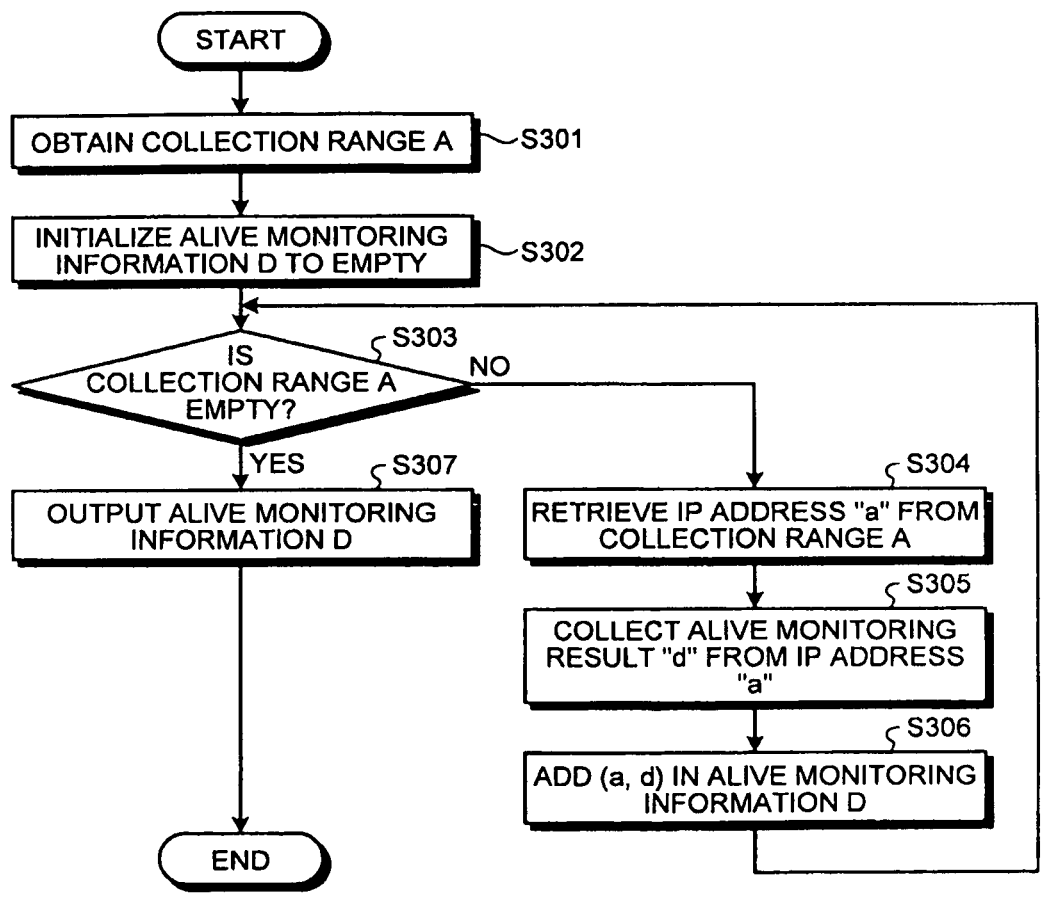
FIG. 8 is a flowchart for explaining the sequence of operations performed by an alive monitoring information collecting unit according to the second embodiment.

FIG. 8 is a flowchart for explaining the sequence of operations performed by the alive monitoring information collecting unit 21. Upon being instructed by the logical formula creating unit 22 or by the logical formula inconsistency resolving unit 24 to collect the alive monitoring information, the alive monitoring information collecting unit 21 starts the operations illustrated in FIG. 8.

Upon being instructed by the logical formula creating unit 22 to collect the alive monitoring information, the alive monitoring information collecting unit 21 first obtains a collection range A of the alive monitoring information (Step S301). Herein, the collection range A is set in advance in accordance with the range of the configuration information.

Subsequently, regarding alive monitoring information D that is collection result, the alive monitoring information collecting unit 21 initializes the alive monitoring information D to empty (Step S302). Then, the alive monitoring information collecting unit 21 determines whether the collection range A is empty (Step S303). If the collection range A is not empty (No at Step S303), the alive monitoring information collecting unit 21 retrieves a single internet protocol (IP) address "a" from the collection range A (Step S304). Subsequently, the alive monitoring information collecting unit 21 issues a ping command to the IP address "a" for obtaining an alive monitoring result "d" of the IP address "a" (Step S305), and adds (a, d) in the alive monitoring information D (Step S306). Then, the system control returns to Step S303. When the collection range A becomes empty (Yes at Step S303), the alive monitoring information collecting unit 21 sends as response the alive monitoring information D, which is the collection result, to the logical formula creating unit 22 or to the logical formula inconsistency resolving unit 24 (Step S307) and ends the operations.

Figure 9:
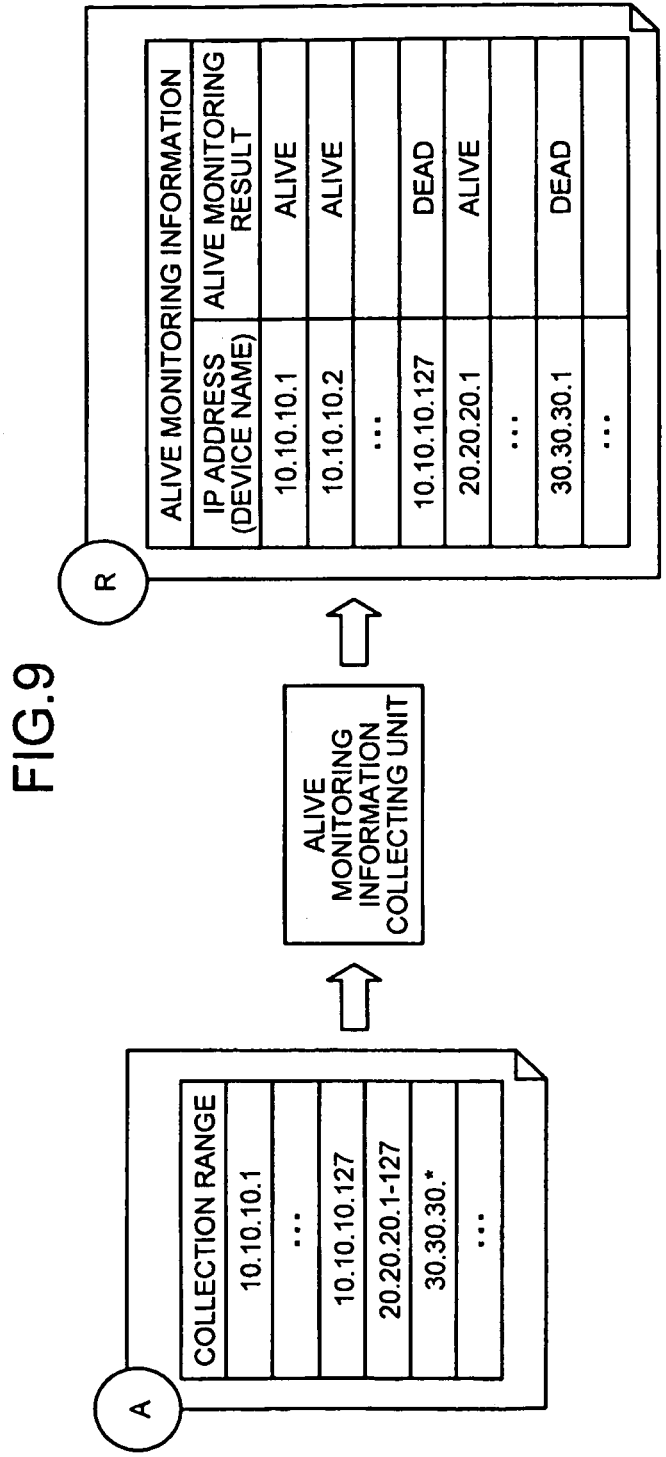
FIG. 9 is an explanatory diagram for explaining a specific example of the operations performed by the alive monitoring information collecting unit according to the second embodiment.

FIG. 9 is an explanatory diagram for explaining a specific example of the operations performed by the alive monitoring information collecting unit 21. As illustrated in FIG. 9, the collection range A includes the IP addresses from which the alive monitoring information is to be collected. Regarding the IP addresses, it is not only possible to individually specify IP addresses such as "10.10.10.1" and "10.10.10.127", but also possible to specify IP address ranges such as "20.20.20.1-127" and "30.30.30.*".

In the alive monitoring information D obtained as the collection result, each IP address included in the collection range A is held in a corresponding manner with the alive monitoring result of either "alive" or "dead". The alive monitoring result of "alive" for a particular IP address indicates confirmation of the fact that there has been a response from that particular IP address and the corresponding device is operating normally. In contrast, the alive monitoring result of "dead" for a particular IP address indicates that no confirmation is obtained regarding the fact that there has been a response from that particular IP address and the corresponding device is operating normally.

Figure 10:
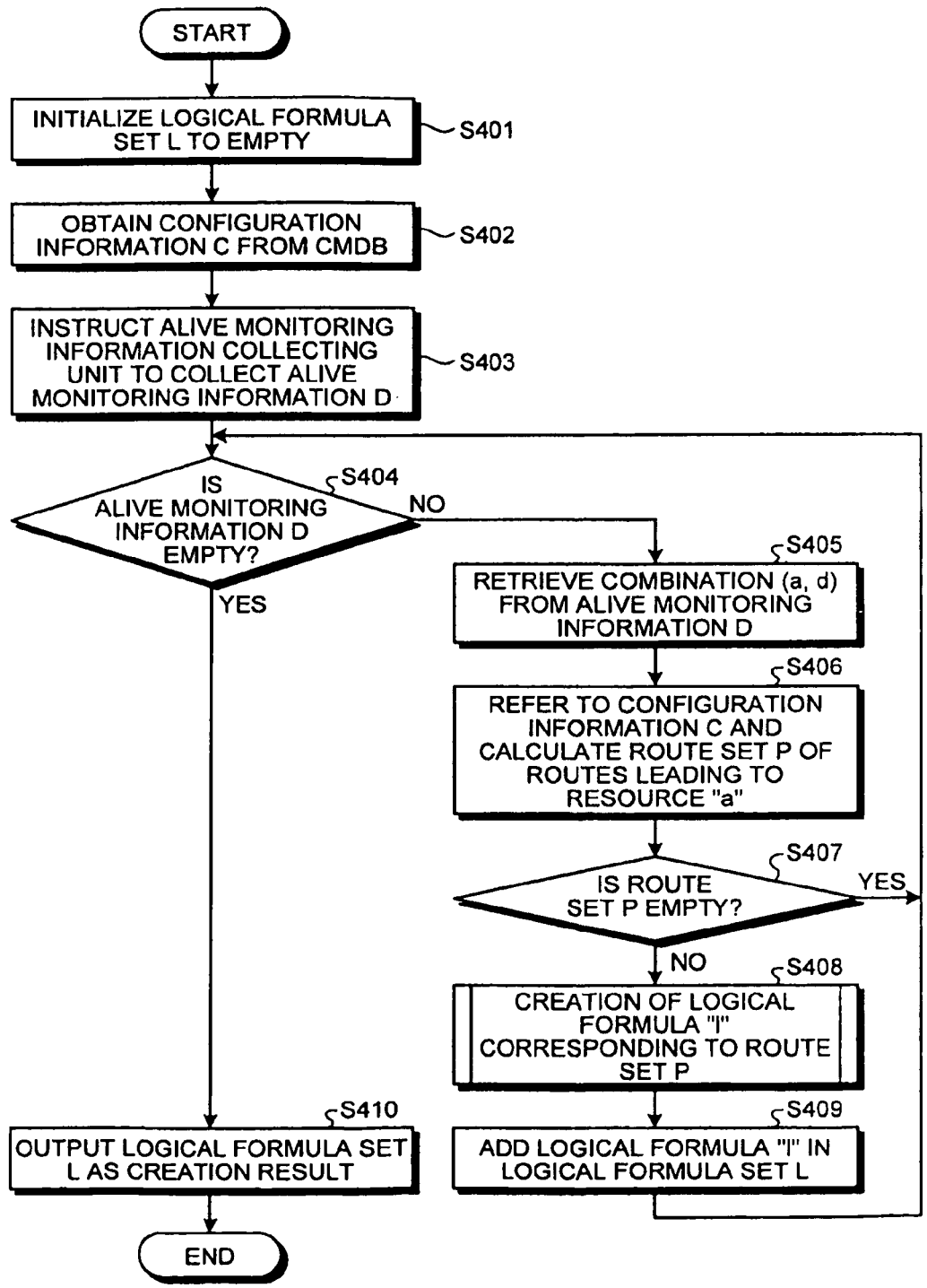
FIG. 10 is a flowchart for explaining the sequence of operations performed by a logical formula creating unit according to the second embodiment.

FIG. 10 is a flowchart for explaining the sequence of operations performed by the logical formula creating unit 22. Upon being instructed by the control unit 20 to create the logical formula set L, the logical formula creating unit 22 starts the operations illustrated in FIG. 10.

Firstly, the logical formula creating unit 22 initializes the logical formula set L to empty (Step S401) and, as configuration information C, obtains the configuration information 33 from the CMDB 32 (Step S402). Then, the logical formula creating unit 22 instructs the alive monitoring information collecting unit 21 to collect the alive monitoring information D (Step S403).

Upon obtaining the alive monitoring information D from the alive monitoring information collecting unit 21, the logical formula creating unit 22 determines whether the alive monitoring information D is empty (Step S404). If the alive monitoring information D is not empty (No at Step S404), then the logical formula creating unit 22 retrieves a single combination (a, d) of the IP address "a" and the corresponding alive monitoring result from the alive monitoring information D (Step S405).

Subsequently, the logical formula creating unit 22 refers to the configuration information C and calculates a route set P regarding the IP address "a" (Step S406). If the route set P is not empty (No at Step S407), then the logical formula creating unit 22 creates a logical formula "1" corresponding to the route set P (Step S408) and adds the logical formula "1" in the logical formula set L (Step S409).

After Step S409 is performed, if the route set P is empty (Yes at Step S407), then the system control returns to Step 5404. When the alive monitoring information D becomes empty (Yes at Step S404), the logical formula creating unit 22 sends as response the created logical formula set L to the control unit 20 (Step S410) and ends the operations.

Figure 11:
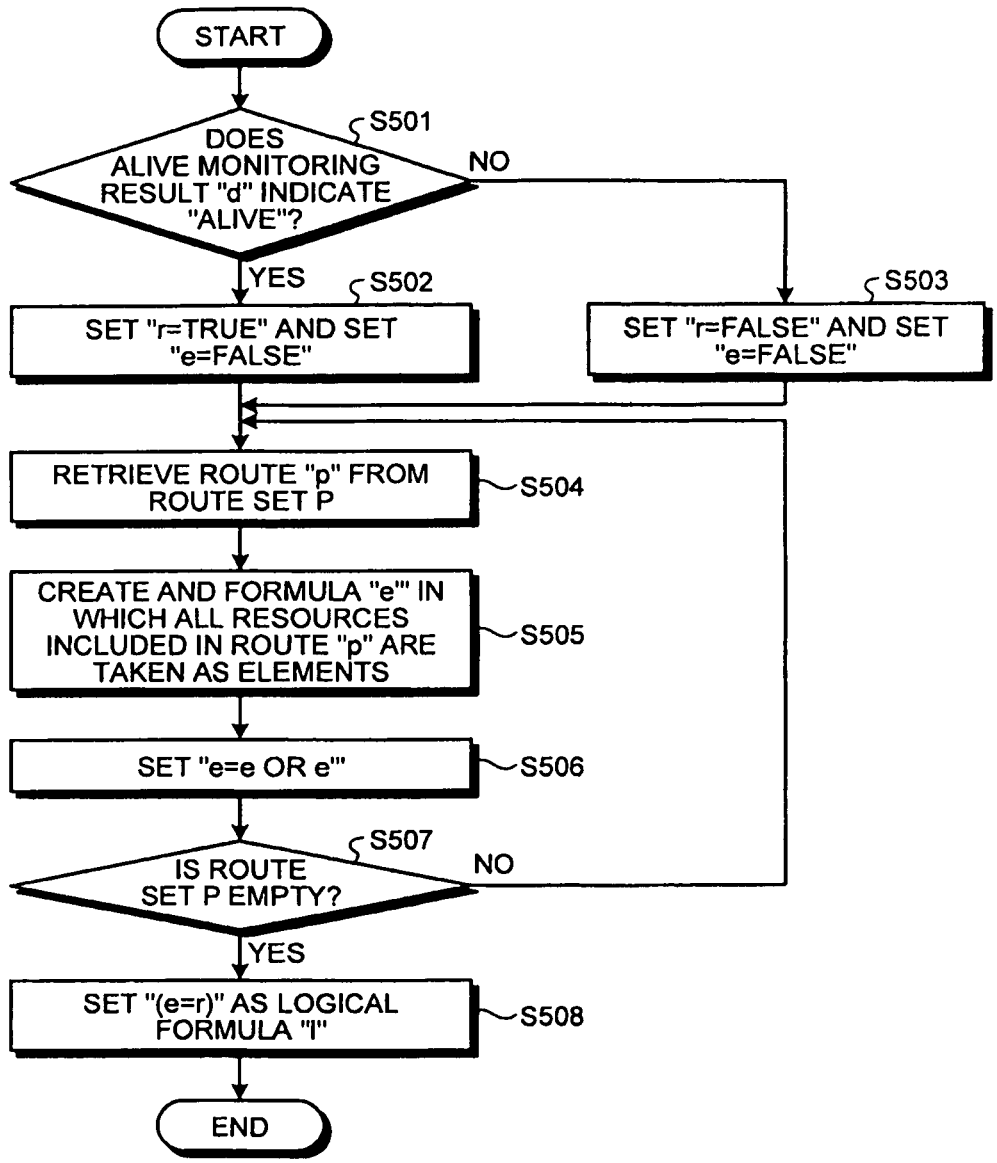
FIG. 11 is a flowchart for explaining in detail the operation of creating a logical formula "1" corresponding to a route set P according to the second embodiment.

FIG. 11 is a flowchart for explaining in detail the operation of creating the logical formula "1" corresponding to the route set P that is performed at Step S408 in FIG. 10. When the alive monitoring result "d" indicates "alive" (Yes at Step S501), the logical formula creating unit 22 sets "r=true" and sets "e=false" (Step S502). On the other hand, when the alive monitoring result "d" indicates "dead" (No at Step S501), the logical formula creating unit 22 sets "r=false" and sets "e=false" (Step S503).

Subsequently, the logical formula creating unit 22 retrieves a single route "p" from the route set P (Step S504). Then, the logical formula creating unit 22 creates an AND formula "e'" in which all resources, that is, all configuration items included in the route P are taken as elements (Step S505). Subsequently, the logical formula creating unit 22 sets "e=e OR e'" (Step S506).

Then, the logical formula creating unit 22 determines whether the route set P is empty (Step S507). If the route set P is not empty (No at Step S507), then the system control returns to Step S504. When the route set P becomes empty (Yes at Step S507), the logical formula creating unit 22 sets "(e=r)" as the logical formula "1" (Step S508) and ends the operation of creating the logical formula "1".

Figure 12:
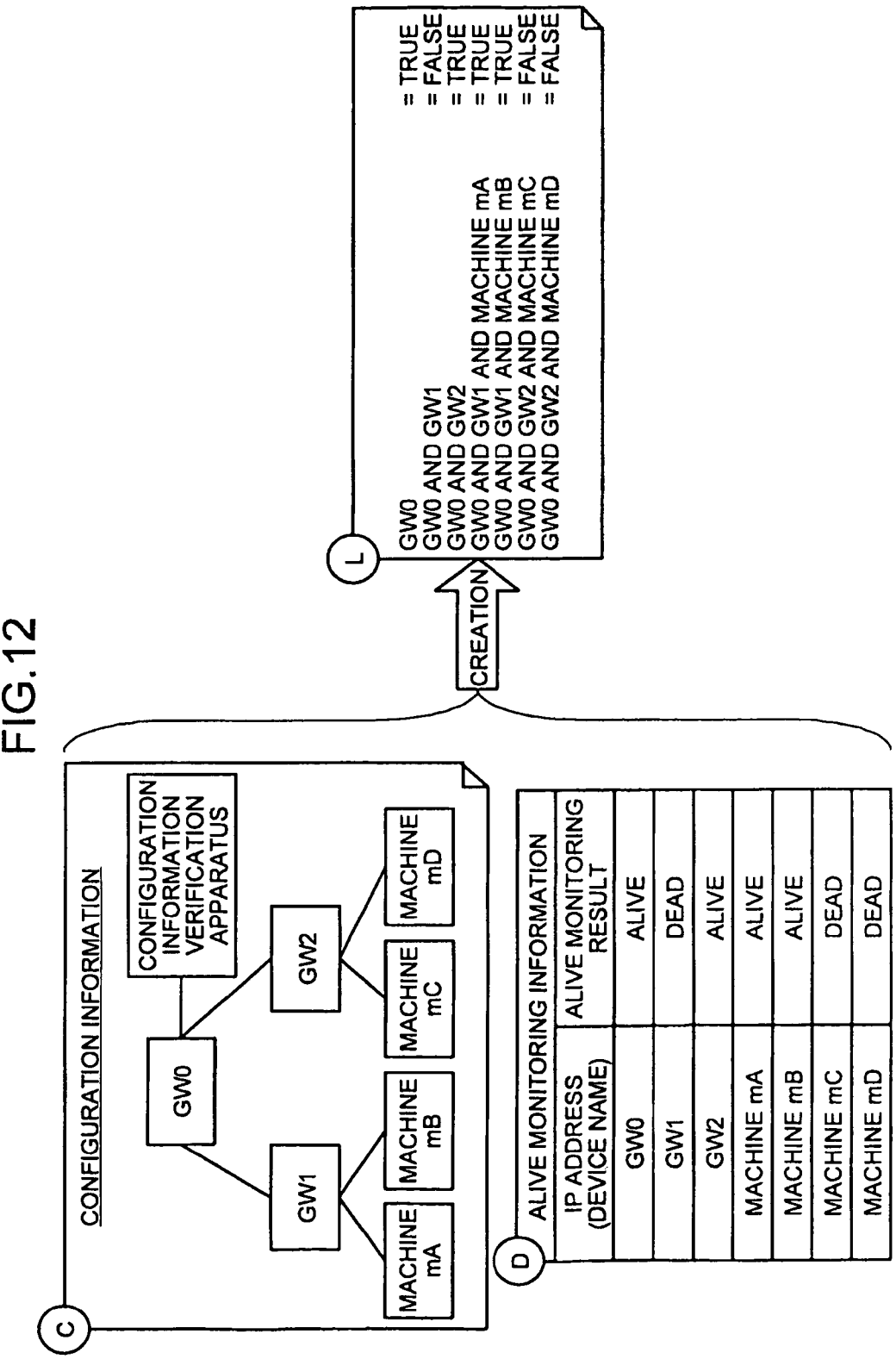
FIG. 12 is an explanatory diagram for explaining a specific example of logical formula creation according to the second embodiment.

FIG. 12 is an explanatory diagram for explaining a specific example of logical formula creation. In the example illustrated in FIG. 12, in the configuration information C, the gateways GW1 and GW2 are connected to the gateway GW0; the machines mA and mB are connected to the gateway GW1; and the machines mC and mD are connected to the gateway GW2.

Moreover, in the example illustrated in FIG. 12, "alive" is assigned as the alive monitoring result of the gateway GW0, the gateway GW2, the machine mA, and the machine mB; while "dead" is assigned as the alive monitoring result of the gateway GW1, the machine mC, and the machine mD.

Thus, in the example illustrated in FIG. 12, following logical formulae are obtained.

Figure 13:
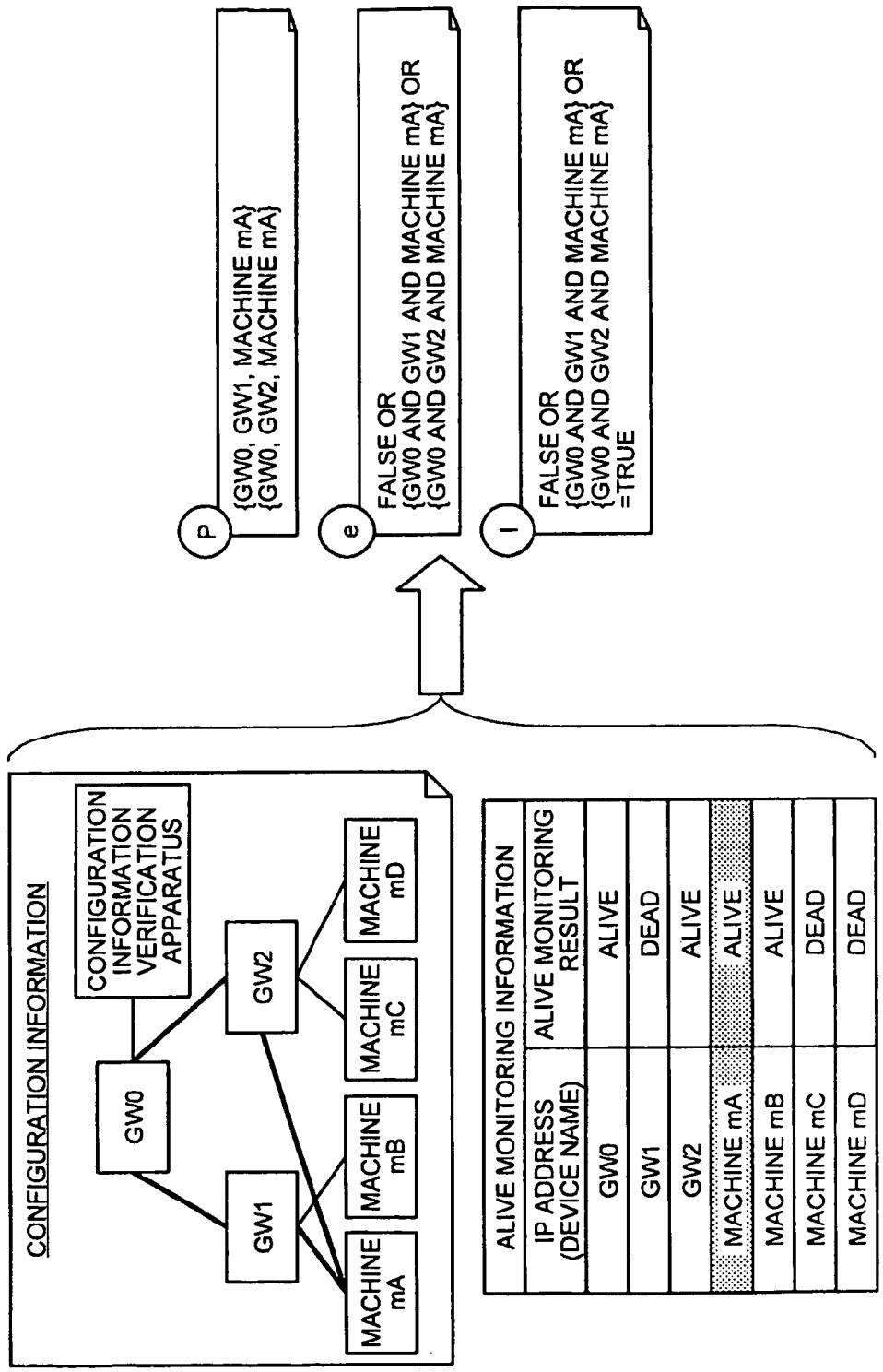
FIG. 13 is an explanatory diagram for explaining logical formula creation according to the second embodiment regarding a configuration item that can be reached via a plurality of routes.

GW0=true
GW0 AND GW1=false
GW0 AND GW2=true
GW0 AND GW1 AND machine mA=true
GW0 AND GW1 AND machine mB=true
GW0 AND GW2 AND machine mC=false
GW0 AND GW2 AND machine mD=false FIG. 13 is an explanatory diagram for explaining logical formula creation regarding a configuration item that can be reached via a plurality of routes. In the example illustrated in FIG. 13, as the routes leading to the machine mA, the route set P is obtained that includes two routes, namely, the route {GW0, GW1, machine mA} and the route {GW0, GW2, machine mA}.

From this route set P, "e" of the logical formula is obtained as follows:

"false OR (GW0 AND GW1 AND machine mA) OR (GW0 AND GW2 AND machine mA)".

Besides, since the alive monitoring result of the machine mA indicates "alive", the logical formula "1" of the machine mA is obtained as follows:

"false OR (GW0 AND GW1 AND machine mA) OR (GW0 AND GW2 AND machine mA)=true".

Figure 14:
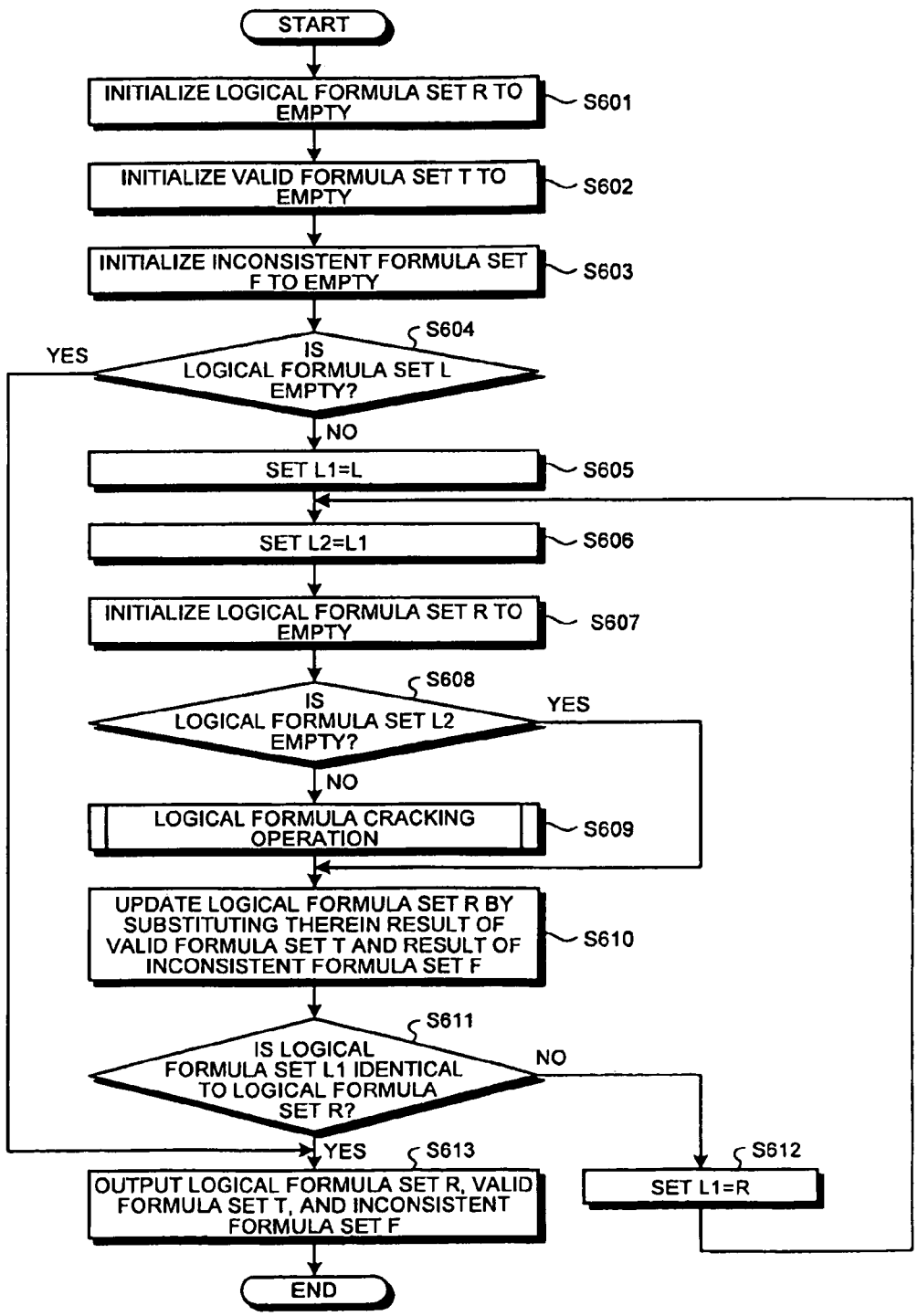
FIG. 14 is a flowchart for explaining the sequence of operations performed by a logical formula verifying unit according to the second embodiment.

FIG. 14 is a flowchart for explaining the sequence of operations performed by the logical formula verifying unit 23. Upon being instructed by the control unit 20 to verify the logical formula set L, the logical formula verifying unit 23 starts the operations illustrated in FIG. 14.

Firstly, the logical formula verifying unit 23 initializes a logical formula set R to empty (Step S601), initializes a valid formula set T to empty (Step S602), and initializes an inconsistent formula set F to empty (Step S603). Subsequently, the logical formula verifying unit 23 determines whether the logical formula set L is empty. (Step S604). If the logical formula set L is not empty (No at Step S604), then the logical formula verifying unit 23 sets a logical formula set L1 equal to the logical formula set L (Step S605) and sets a logical formula set L2 equal to the logical formula set L1 (Step S606).

Subsequently, the logical formula verifying unit 23 initializes the logical formula set R to empty (Step S607) and determines whether the logical formula set L2 is empty (Step S608). If the logical formula set L2 is not empty (No at Step S608), then the logical formula verifying unit 23 performs a logical formula cracking operation (Step S609). After Step S609 is performed or if the logical formula set L2 is empty (Yes at Step S608), the logical formula verifying unit 23 updates the logical formula set R by substituting therein the result of the valid formula set T and the result of the inconsistent formula set F (Step S610).

Subsequently, the logical formula verifying unit 23 determines whether the logical formula set L1 and the logical formula R are identical (Step S611). If the logical formula set L1 and the logical formula R are not identical (No at Step S611), then the logical formula verifying unit 23 sets the logical formula set L1 equal to the logical formula set R (Step S612) and the system control returns to Step S606.

On the other hand, if the logical formula set L1 and the logical formula R are identical (Yes at Step S611) or if the logical formula set L is empty (Yes at Step S604), then the logical formula verifying unit 23 sends as response the logical formula set R, the valid formula set T, and the inconsistent formula set F to the control unit 20 (Step S613) and ends the operations.

Figure 15:
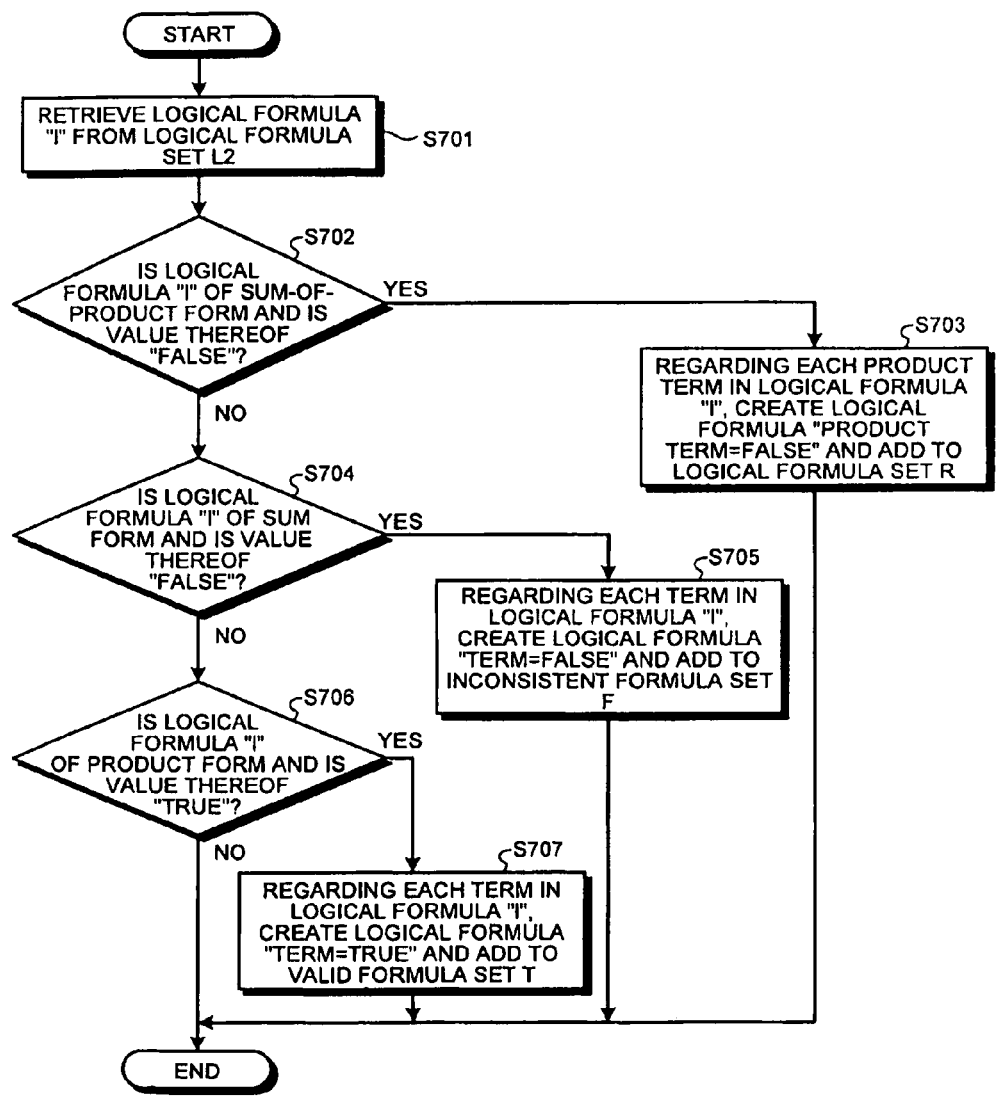
FIG. 15 is a flowchart for explaining a logical formula cracking operation according to the second embodiment.

FIG. 15 is a flowchart for explaining the logical formula cracking operation performed at Step S609 illustrated in FIG. 14. Firstly, the logical formula verifying unit 23 retrieves a single logical formula "1" from the logical formula set L2 (Step S701) and determines whether the logical formula "1" is of the sum-of-product form and has the "false" value (Step S702).

If the logical formula "1" is of the sum-of-product form and has the "false" value (Yes at Step S702); then, regarding each product term in the logical formula "1", the logical formula verifying unit 23 creates a logical formula "product term=false" and adds it to the logical formula set R (Step S703).

On the other hand, if the logical formula "1" is not of the sum-of-product form or if logical formula "1" has the "true" value (No at Step S702), then the logical formula verifying unit 23 determines whether the logical formula "1" is of the sum form and has the "false" value (Step S704).

If the logical formula "1" is of the sum form and has the "false" value (Yes at Step S704); then, regarding each term in the logical formula "1", the logical formula verifying unit 23 creates a logical formula "term=false" and adds it to the inconsistent formula set F (Step S705).

In contrast, if the logical formula "1" is not of the sum form or if the logical formula "1" has the "true" value (No at Step S704), then the logical formula verifying unit 23 determines whether the logical formula "1" is of the product form and has the "true" value (Step S706).

If the logical formula "1" is of the product form and has the "true" value (Yes at Step S706); then, regarding each term in the logical formula "1", the logical formula verifying unit 23 creates a logical formula "term=true" and adds it to the valid formula set T (Step S707).

In contrast, if the logical formula "1" is not of the product form or if the logical formula "1" has the "false" value (No at Step S706); then the logical formula verifying unit 23 ends the logical formula cracking operation. Besides, upon performing any one of Steps S703, S705, and S707; the logical formula verifying unit 23 ends the logical formula cracking operation.

Figure 16:
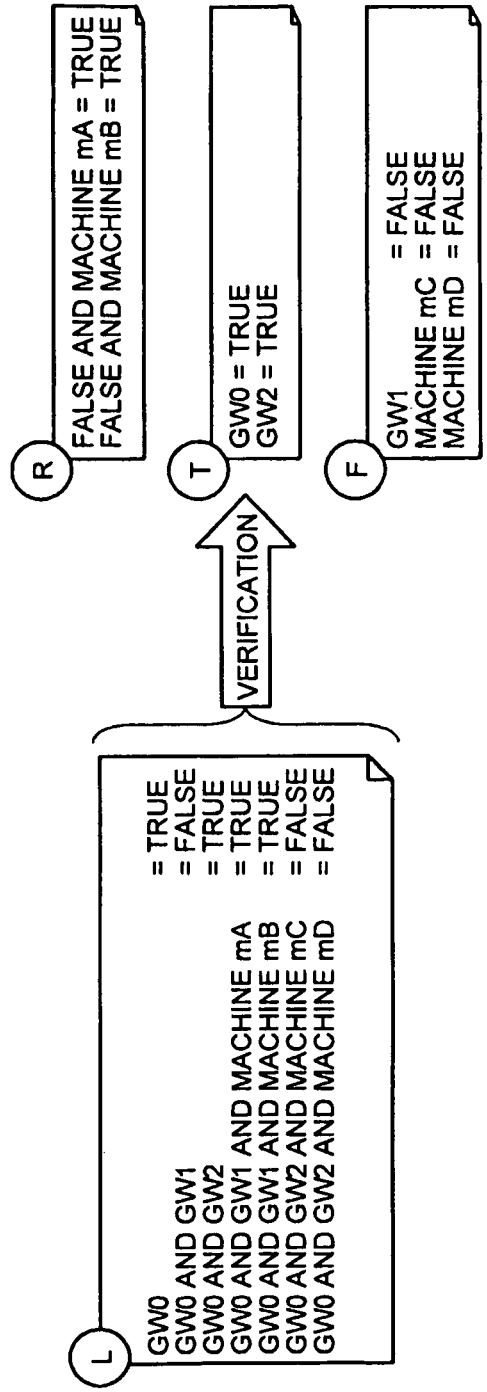
FIG. 16 is an explanatory diagram for explaining a specific example of the operations performed by the logical formula verifying unit according to the second embodiment.

FIG. 16 is an explanatory diagram for explaining a specific example of the operations performed by the logical formula verifying unit 23. When the logical formula set L created by the logical formula creating unit 22 includes the following logical formulae:

GW0=true
GW0 AND GW1=false
GW0 AND GW2=true
GW0 AND GW1 AND machine mA=true
GW0 AND GW1 AND machine mB=true
GW0 AND GW2 AND machine mC=false
GW0 AND GW2 AND machine mD=false, the logical formula verifying unit 23 creates the logical formula set R, the valid formula set T, and the inconsistent formula set F from the logical formula set L.

The valid formula set T is the set of valid formulae obtained from the logical formula set L. The inconsistent formula set F is the set of inconsistent formulae obtained from the logical formula set L. The logical formula set R is the set obtained from the logical formula set L of such logical formulae that cannot be subjected to further calculation.

The explanation regarding the mechanism of creating the logical formula set R, the valid formula set T, and the inconsistent formula set F is given below with reference to FIGS. 17 to 22. The logical formula set L2 illustrated in FIG. 17 is in the initial state having identical contents as that of the logical formula set L created by the logical formula creating unit 22.

Figure 17:
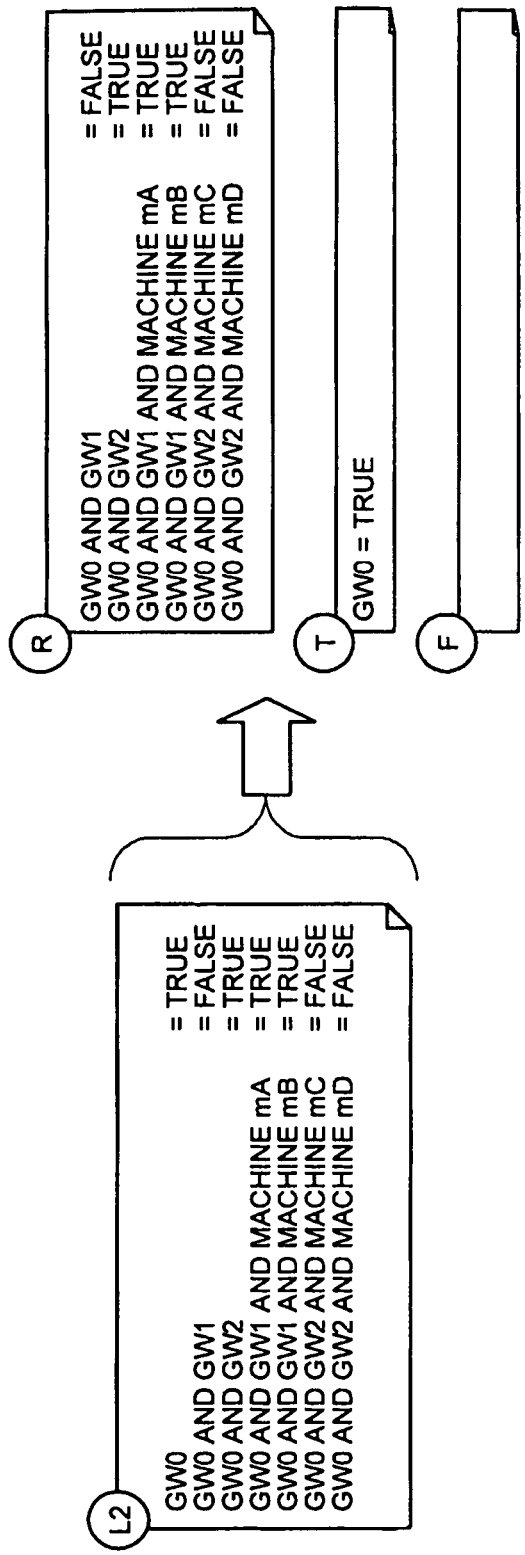
FIG. 17 is a first explanatory diagram for explaining the mechanism of creating a logical formula set R, a valid formula set T, and an inconsistent formula set F according to the second embodiment.

From the logical formula set L2 illustrated in FIG. 17, the logical formula verifying unit 23 retrieves the valid formula "GW0=true" and inputs it in the valid formula set T. Since no inconsistent formulae are included in the logical formula set L2 illustrated in FIG. 17, the inconsistent formula set F remains empty. The remaining logical formulae are all input in the logical formula set R.

Figure 18:
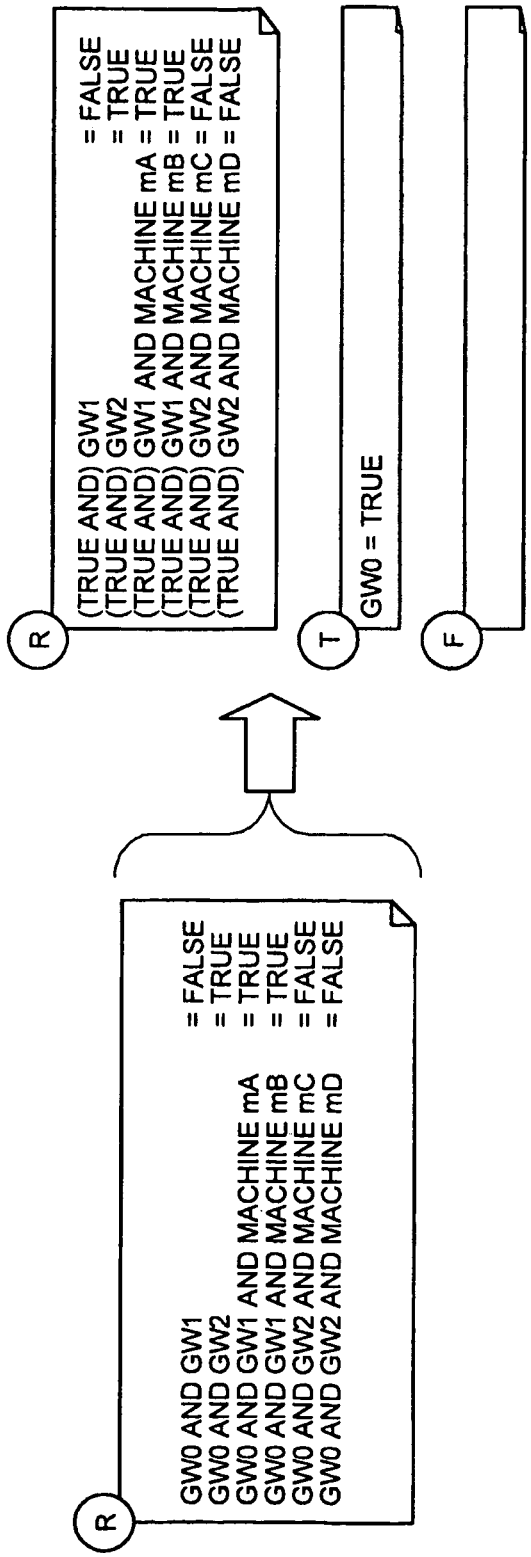
FIG. 18 is a second explanatory diagram for explaining the mechanism of creating the logical formula set R, the valid formula set T, and the inconsistent formula set F according to the second embodiment.

Subsequently, as illustrated in FIG. 18, the logical formula verifying unit 23 updates the logical formula set R by substituting therein the logical formulae included in the valid formula set T and the inconsistent formula set F. As a result, the logical formula set R is updated to include the following logical formulae.

Figure 19:
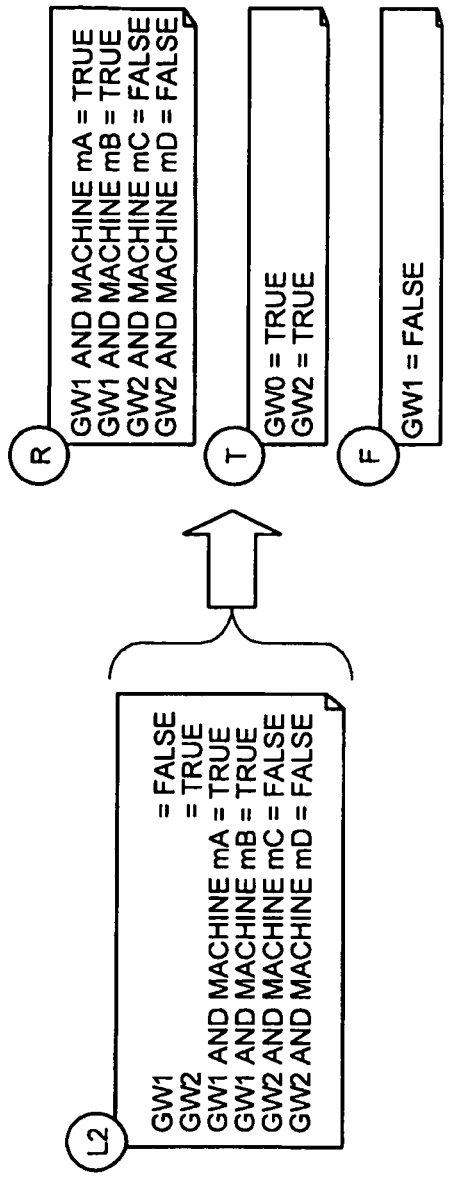
FIG. 19 is a third explanatory diagram for explaining the mechanism of creating the logical formula set R, the valid formula set T, and the inconsistent formula set F according to the second embodiment.

(true AND) GW1=false
(true AND) GW2=true
(true AND) GW1 AND machine mA=true
(true AND) GW1 AND machine mB=true
(true AND) GW2 AND machine mC=false
(true AND) GW2 AND machine mD=false Then, as illustrated in FIG. 19, the logical formula verifying unit 23 moves the updated logical formula set R in the logical formula set L2. At that time, since "(true AND)" can be omitted, the logical formula set L2 includes the following logical formulae.

GW1=false
GW2=true
GW1 AND machine mA=true
GW1 AND machine mB=true
GW2 AND machine mC=false
GW2 AND machine mD=false From the logical formula set L2 illustrated in FIG. 19, the logical formula verifying unit 23 retrieves the valid formula "GW2=true" and inputs it in the valid formula set T. Similarly, from the logical formula set L2 illustrated in FIG. 19, the logical formula verifying unit 23 retrieves the inconsistent formula "GW1=false" and inputs it in the inconsistent formula set F.

Besides, the logical formula verifying unit 23 inputs the remaining logical formulae in the logical formula set R. Consequently, the logical formula set R includes the following logical formulae.

Figure 20:
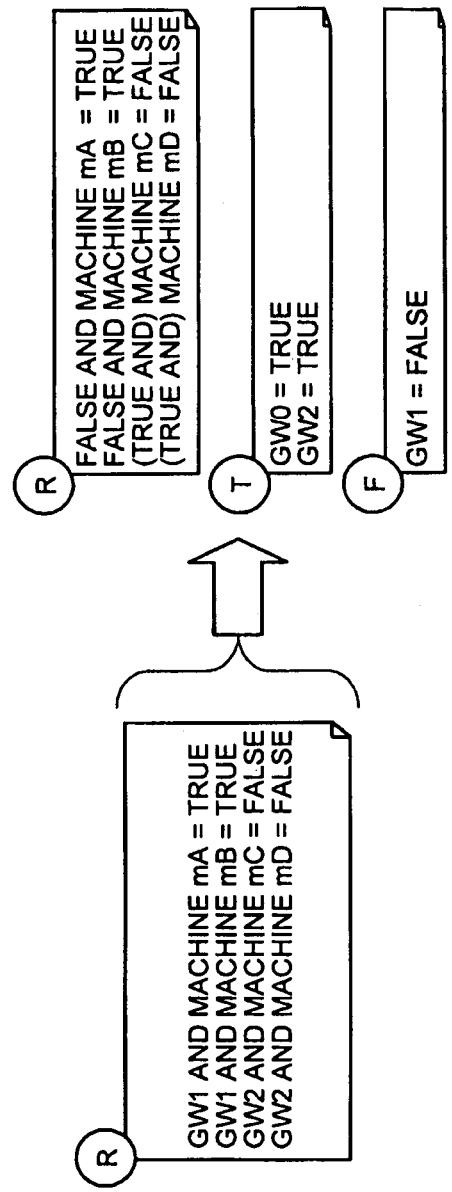
FIG. 20 is a fourth explanatory diagram for explaining the mechanism of creating the logical formula set R, the valid formula set T, and the inconsistent formula set F according to the second embodiment.
Figure 21:
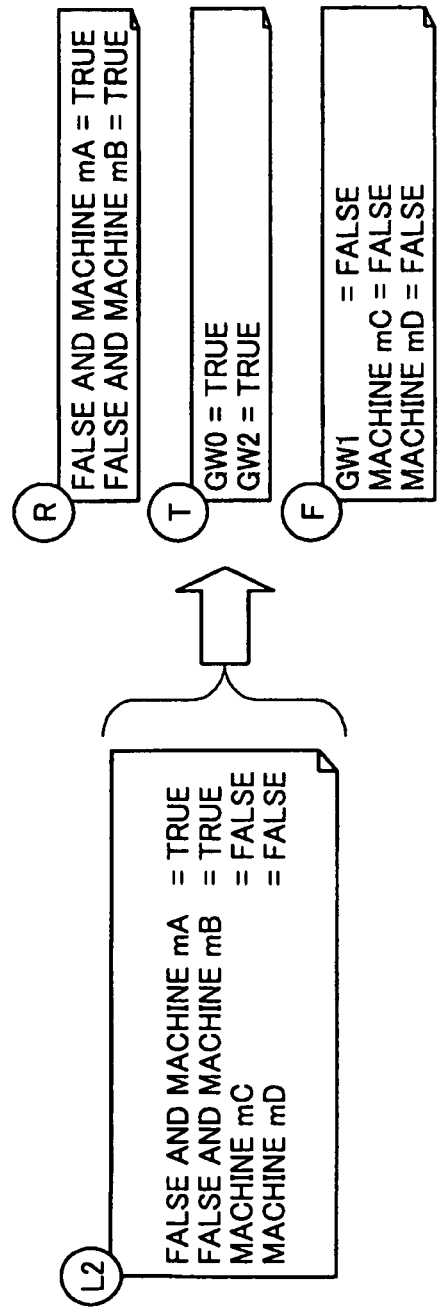
FIG. 21 is a fifth explanatory diagram for explaining the mechanism of creating the logical formula set R, the valid formula set T, and the inconsistent formula set F according to the second embodiment.

GW1 AND machine mA=true
GW1 AND machine mB=true
GW2 AND machine mC=false
GW2 AND machine mD=false Subsequently, as illustrated in FIG. 20, the logical formula verifying unit 23 updates the logical formula set R by substituting therein the logical formulae included in the valid formula set T and the inconsistent formula set F. As a result, the logical formula set R is updated to include the following logical formulae.

false AND machine mA=true
false AND machine mB=true
(true AND) machine mC=false
(true AND) machine mD=false Then, as illustrated in FIG. 21, the logical formula verifying unit 23 moves the updated logical formula set R in the logical formula set L2. At that time, since "(true AND)" can be omitted, the logical formula set L2 includes the following logical formulae.

false AND machine mA=true
false AND machine mB=true
machine mC=false
machine mD=false From the logical formula set L2 illustrated in FIG. 21, the logical formula verifying unit 23 retrieves the inconsistent formulae "machine MC=false" and "machine mD=false", and inputs them in the inconsistent formula set F. Since no valid formulae are included in the logical formula set L2 illustrated in FIG. 21, the logical formula verifying unit 23 inputs the remaining logical formulae in the logical formula set R. Hence, the logical formula set R includes the following logical formulae.

false AND machine mA=true
false AND machine mB=true

Figure 22:
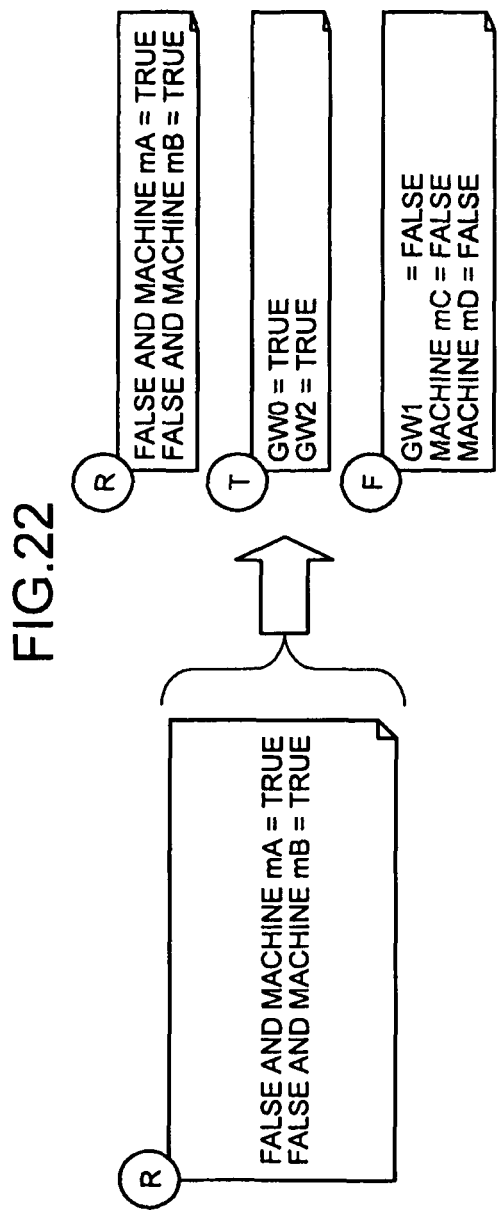
FIG. 22 is a sixth explanatory diagram for explaining the mechanism of creating the logical formula set R, the valid formula set T, and the inconsistent formula set F according to the second embodiment.

Subsequently, the logical formula verifying unit 23 updates the logical formula set R by substituting therein the logical formulae included in the valid formula set T and the inconsistent formula set F. However, since no substitutable logical formulae are present as illustrated in FIG. 22, the logical formula set R remains the same.

In this way, the logical formulae included in the logical formula set R cannot be subjected to further calculation. By performing the calculation until the repeated calculation does not make any difference in the logical formulae included in the logical formula set R, the logical formula verifying unit 23 obtains the logical formula set R, the valid formula set T, and the inconsistent formula set F as illustrated in FIG. 16.

Figure 23:
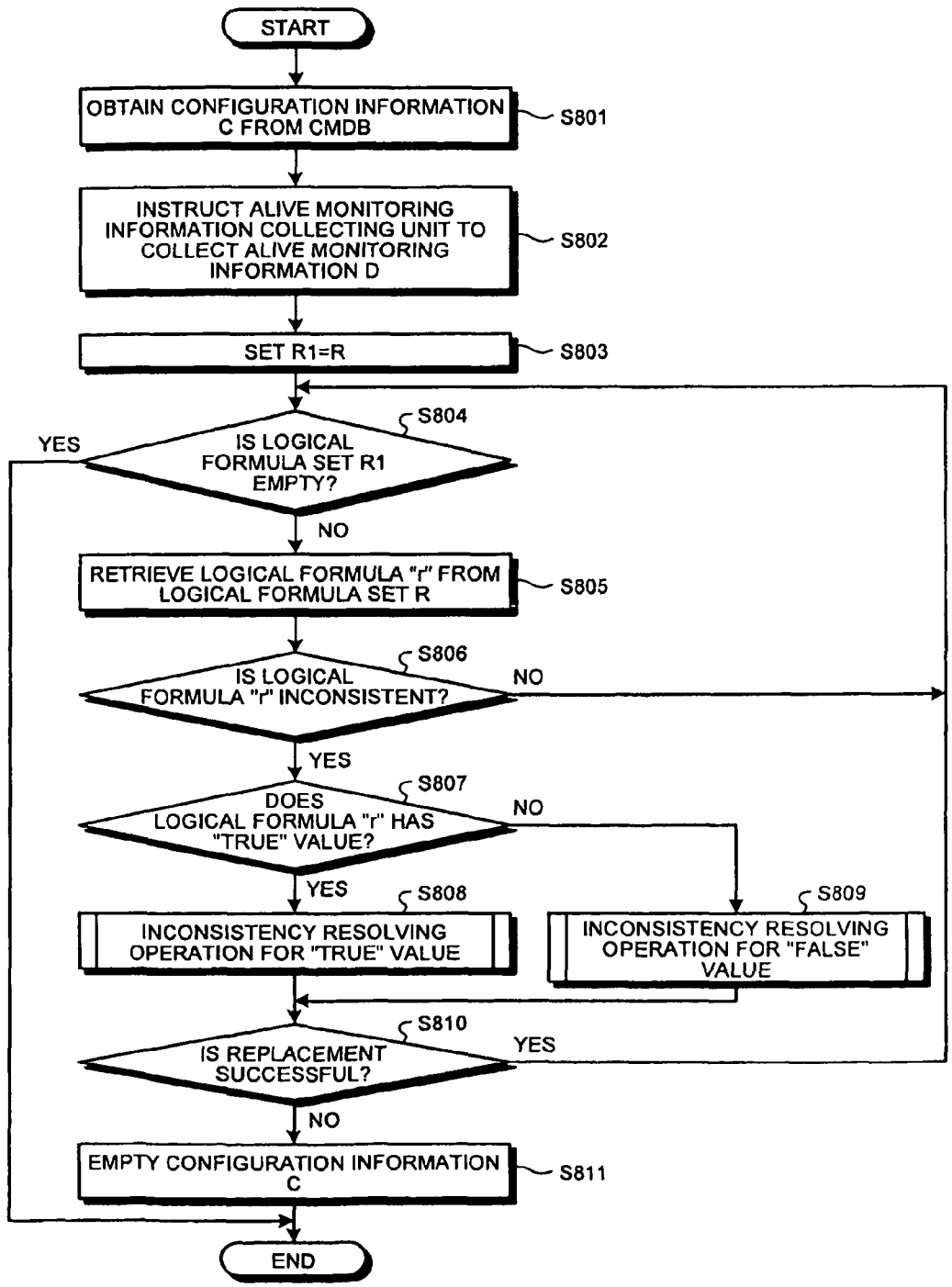
FIG. 23 is a flowchart for explaining the sequence of operations performed by a logical formula inconsistency resolving unit according to the second embodiment.

FIG. 23 is a flowchart for explaining the sequence of operations performed by the logical formula inconsistency resolving unit 24. Upon being requested by the control unit 20 to resolve inconsistency in logical formulae, the logical formula inconsistency resolving unit 24 starts the operations illustrated in FIG. 23.

Firstly, the logical formula inconsistency resolving unit 24 obtains the configuration information 33 from the CMDB 32 and sets the configuration information 33 as the configuration information C (Step S801). Besides, the logical formula inconsistency resolving unit 24 instructs the alive monitoring information collecting unit 21 to collect the alive monitoring information D (Step S802).

Moreover, the logical formula inconsistency resolving unit 24 sets the logical formula set R as the logical formula set R1 (Step S803). As described above, the logical formula set R output by the logical formula verifying unit 23 is the set of such logical formulae that cannot be subjected to further calculation.

Then, the logical formula inconsistency resolving unit 24 determines whether the logical formula set R1 is empty (Step S804). If the logical formula set R1 is not empty (No at Step S804), then the logical formula inconsistency resolving unit 24 retrieves a single logical formula "r" from the logical formula set R (Step S805) and determines whether the logical formula "r" is an inconsistent logical formula (Step S806). If the logical formula "r" is an inconsistent logical formula (Yes at Step S806), then the logical formula inconsistency resolving unit 24 determines whether the logical formula "r" has the "true" value (Step S807).

If the logical formula "r" has the "true" value (Yes at Step S807), then the logical formula inconsistency resolving unit 24'performs an inconsistency resolving operation for the "true" value (Step S808). On the other hand, if the logical formula "r" has the "false" value (No at Step S807), then the logical formula inconsistency resolving unit 24 performs an inconsistency resolving operation for the "false" value (Step S809).

Upon performing one of the inconsistency resolving operations, the logical formula inconsistency resolving unit 24 determines whether the inconsistency resolving operation was successful in resolving inconsistency by means of replacing the configuration items (Step S810). If inconsistency was not resolved due to the failure in replacing the configuration items (No at Step S810), then the logical formula inconsistency resolving unit 24 empties the configuration information C (Step S811) and ends the operations.

On the other hand, if inconsistency was resolved by successfully replacing the configuration items (Yes at Step S810), then the system control returns to Step S804. When the logical formula "r" is not an inconsistent logical formula (Yes at Step S806), the system control returns to Step S804. When the logical formula set R1 becomes empty (Yes at Step S804), the logical formula inconsistency resolving unit 24 ends the operations.

Figure 24:
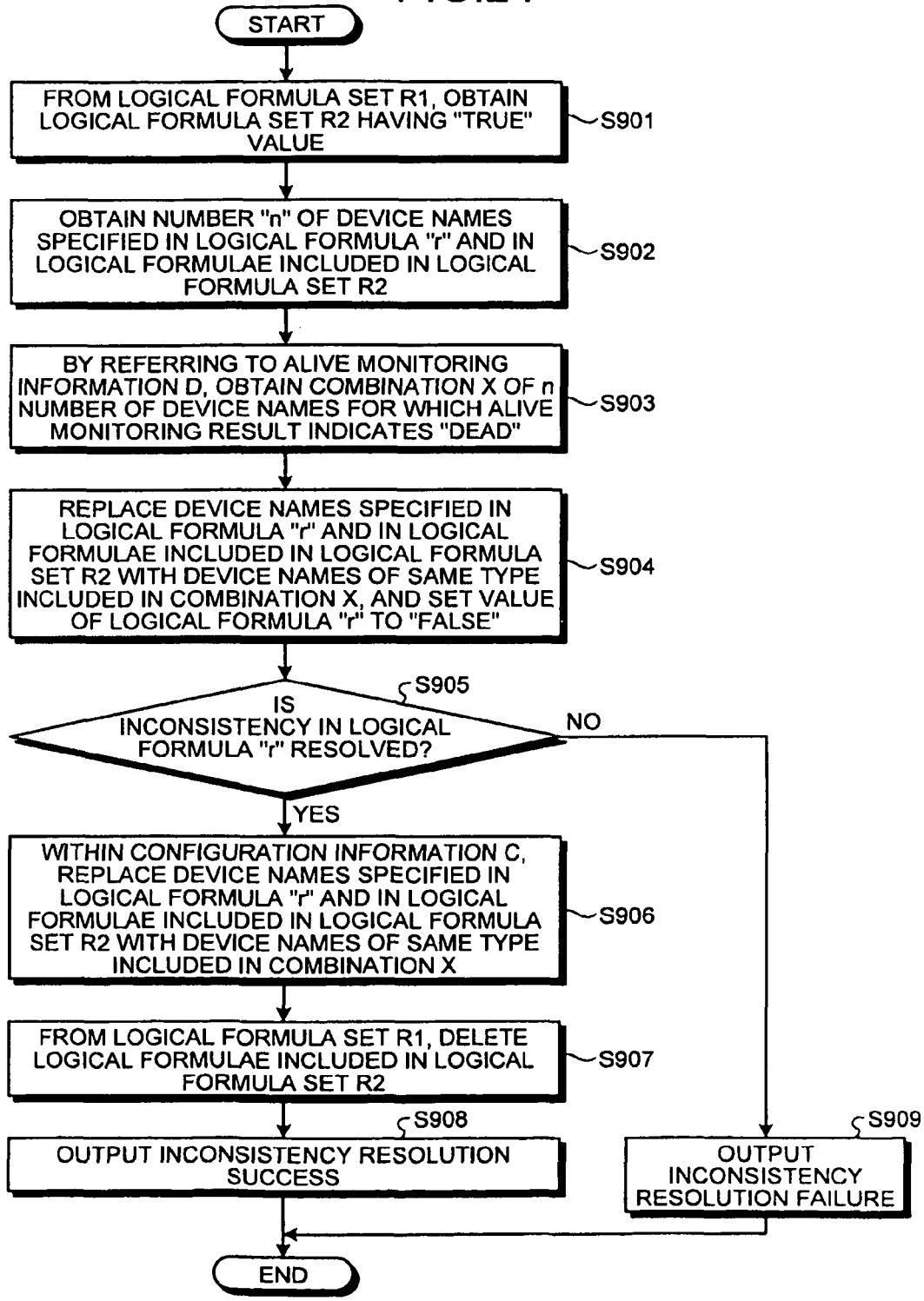
FIG. 24 is a flowchart for explaining in detail an inconsistency resolving operation for the "true" value according to the second embodiment.

FIG. 24 is a flowchart for explaining in detail the inconsistency resolving operation for the "true" value illustrated in FIG. 23. Firstly, the logical formula inconsistency resolving unit 24 obtains, from the logical formula set R1, a logical formula set R2 having the "true" value (Step S901). Moreover, the logical formula inconsistency resolving unit 24 obtains a number "n" of the device names specified in the logical formula "r" and in the logical formulae included in the logical formula set R2 (Step S902).

Subsequently, the logical formula inconsistency resolving unit 24 obtains, from the alive monitoring information D, a combination X of n number of device names for which the alive monitoring result indicates "dead" (Step S903). Then, the logical formula inconsistency resolving unit 24 replaces the device names specified in the logical formula "r" and in the logical formulae included in the logical formula set R2 with the device names of the same type included in the combination X, and sets the value of the logical formula "r" to "false" (Step S904).

Subsequently, the logical formula inconsistency resolving unit 24 determines whether the replacement has led to the resolution of inconsistency in the logical formula "r". (Step S905). If the inconsistency is not resolved (No at Step S905), then the logical formula inconsistency resolving unit 24 outputs inconsistency resolution failure (Step S909) and ends the inconsistency resolving operation for the "true" value.

On the other hand, if the inconsistency has been resolved (Yes at Step S905), then the logical formula inconsistency resolving unit 24 replaces, within the configuration information C, the device names specified in the logical formula "r" and in the logical formulae included in the logical formula set R2 with the device names of the same type included in the combination X (Step S906). Subsequently, the logical formula inconsistency resolving unit 24 deletes, from the logical formula set R1, the logical formulae included in the logical formula set R2 (Step S907) and outputs inconsistency resolution success (Step S908), before ending the inconsistency resolving operation for the "true" value.

Figure 25:
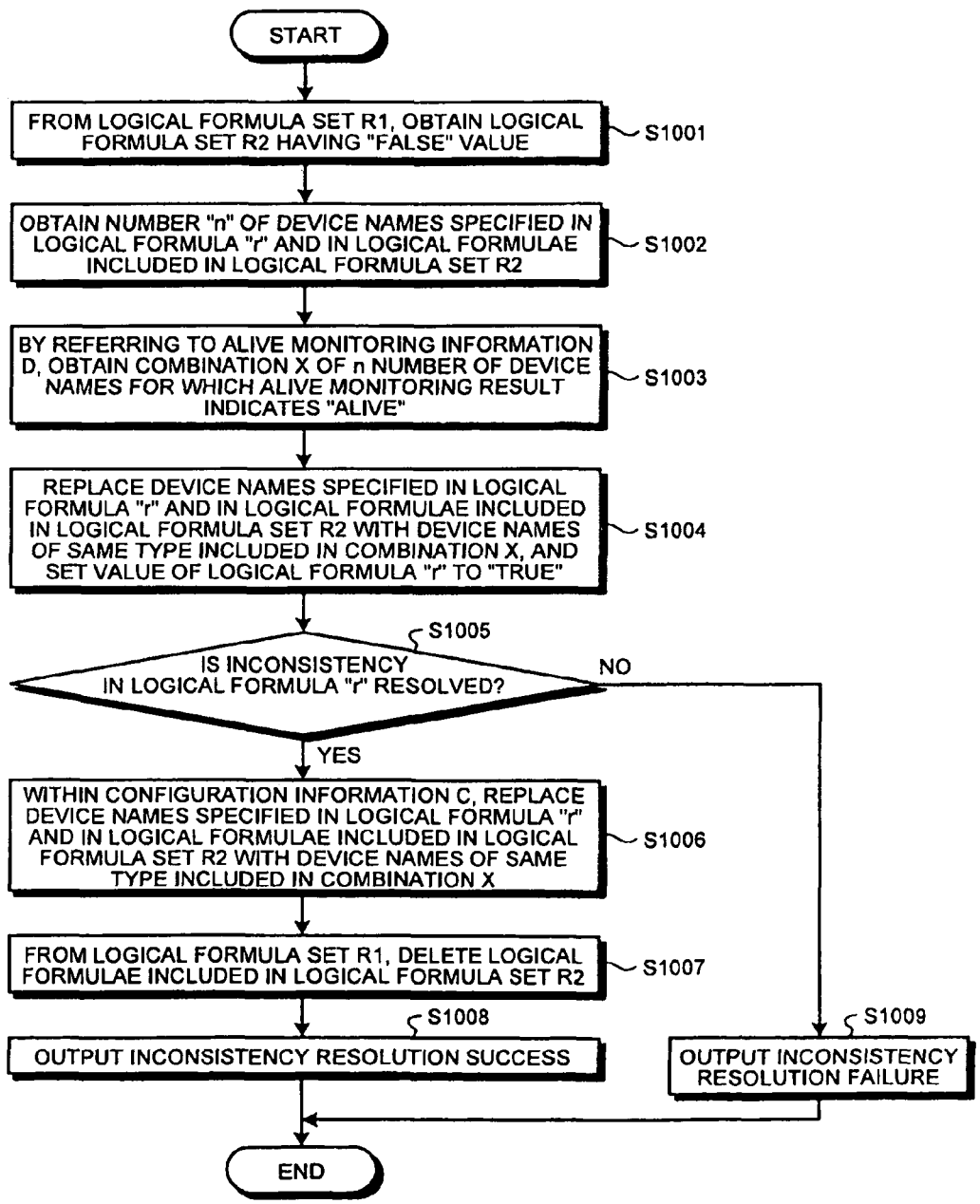
FIG. 25 is a flowchart for explaining in detail an inconsistency resolving operation for the "false" value according to the second embodiment.

FIG. 25 is a flowchart for explaining in detail the inconsistency resolving operation for the "false" value illustrated in FIG. 23. Firstly, the logical formula inconsistency resolving unit 24 obtains, from the logical formula set R1, the logical formula set R2 having the "false" value (Step S1001). Moreover, the logical formula inconsistency resolving unit 24 obtains the number "n" of device names specified in the logical formula "r" and in the logical formulae included in the logical formula set R2 (Step S1002).

Subsequently, the logical formula inconsistency resolving unit 24 obtains, from the alive monitoring information D, the combination X of n number of device names for which the alive monitoring result indicates "alive" (Step S1003). Then, the logical formula inconsistency resolving unit 24 replaces the device names specified in the logical formula "r" and in the logical formulae included in the logical formula set R2 with the device names of the same type included in the combination X, and sets the value of the logical formula "r" to "true" (Step S1004).

Subsequently, the logical formula inconsistency resolving unit 24 determines whether the replacement has led to the resolution of inconsistency in the logical formula r (Step S1005). If the inconsistency is not resolved (No at Step S1005), then the logical formula inconsistency resolving unit 24 outputs inconsistency resolution failure (Step S1009) and ends the inconsistency resolving operation for the "false" value.

On the other hand, if the inconsistency has been resolved (Yes at Step S1005), then the logical formula inconsistency resolving unit 24 replaces, within the configuration information C, the device names specified in the logical formula "r" and in the logical formulae included in the logical formula set R2 with the device names of the same type included in the combination X (Step S1006). Subsequently, the logical formula inconsistency resolving unit 24 deletes, from the logical formula set R1, the logical formulae included in the logical formula set R2 (Step S1007) and outputs inconsistency resolution success (Step S1008), before ending the inconsistency resolving operation for the "false" value.

Figure 26:
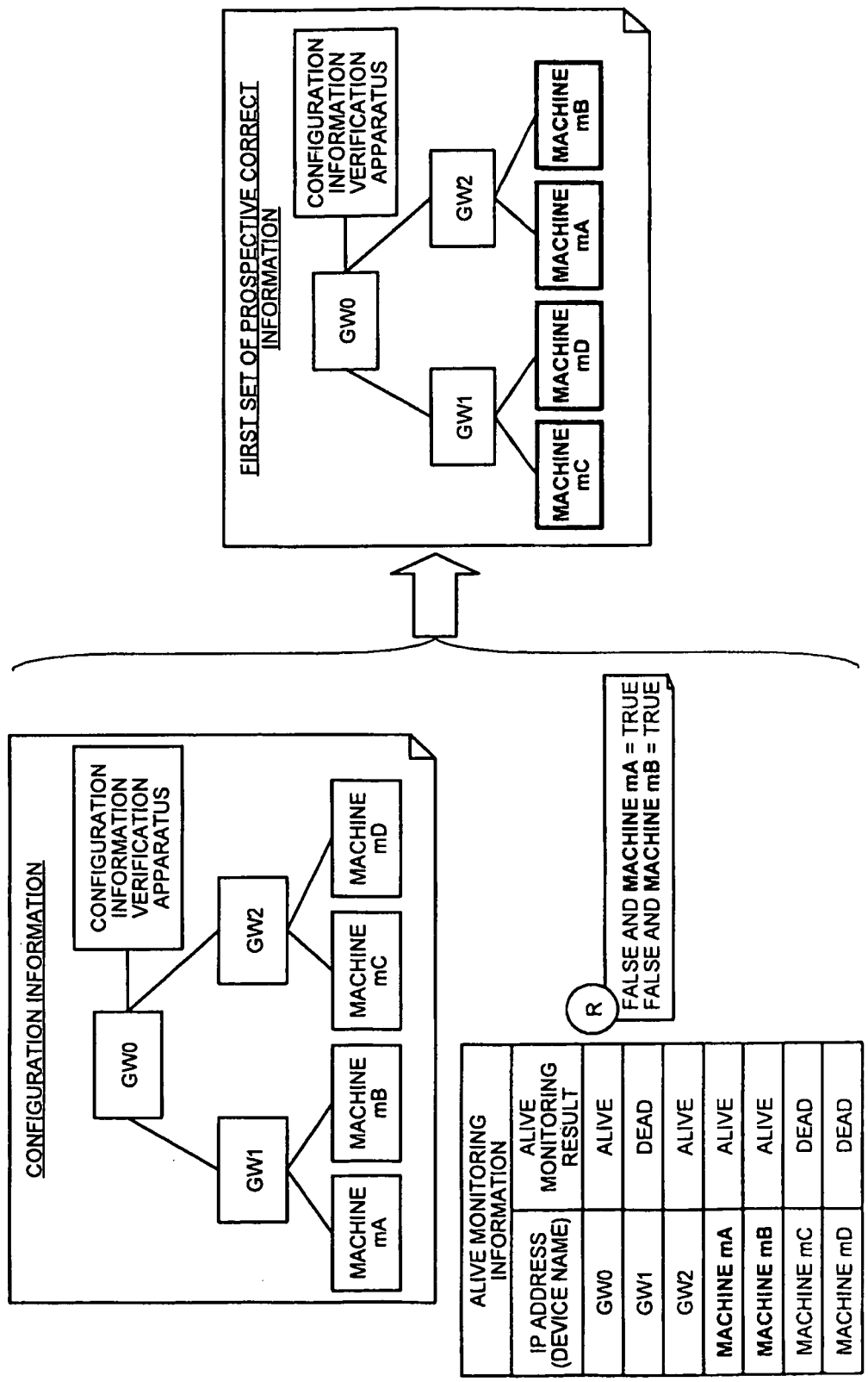
FIG. 26 is an explanatory diagram for explaining a specific example of inconsistency resolution performed by the logical formula inconsistency resolving unit according to the second embodiment.

FIG. 26 is an explanatory diagram for explaining a specific example of inconsistency resolution performed by the logical formula inconsistency resolving unit 24. In the example illustrated in FIG. 26, the current configuration information indicates that the gateways GW1 and GW2 are connected to the gateway GW0; indicates that the machines mA and mB are connected to the gateway GW1; and indicates that the machines mC and mD are connected to the gateway GW2. Moreover, in the example illustrated in FIG. 26, in the alive monitoring information, "alive" is assigned as the alive monitoring result of the gateway GW0, the gateway GW2, the machine mA, and the machine mB; while "dead" is assigned as the alive monitoring result of the gateway GW1, the machine mC, and the machine mD. Furthermore, in the example illustrated in FIG. 26, the logical formula set R created by the logical formula verifying unit 23 includes the following logical formulae.

false AND machine mA=true
false AND machine mB=true

With the use of such information, the logical formula inconsistency resolving unit 24 obtains the prospective correct configuration information. In the example illustrated in FIG. 26, the prospective correct configuration information indicates that the gateways GW1 and GW2 are connected to the gateway GW0; indicates that the machines mC and mD are connected to the gateway GW1; and indicates that the machines mA and mB are connected to the gateway GW2.

The mechanism of obtaining the prospective correct configuration information is explained below with reference to FIGS. 27 and 28. The configuration information C illustrated in FIG. 27 has identical contents to the contents of the configuration information 33 retrieved in the initial state from the CMDB 32.

Figure 27:
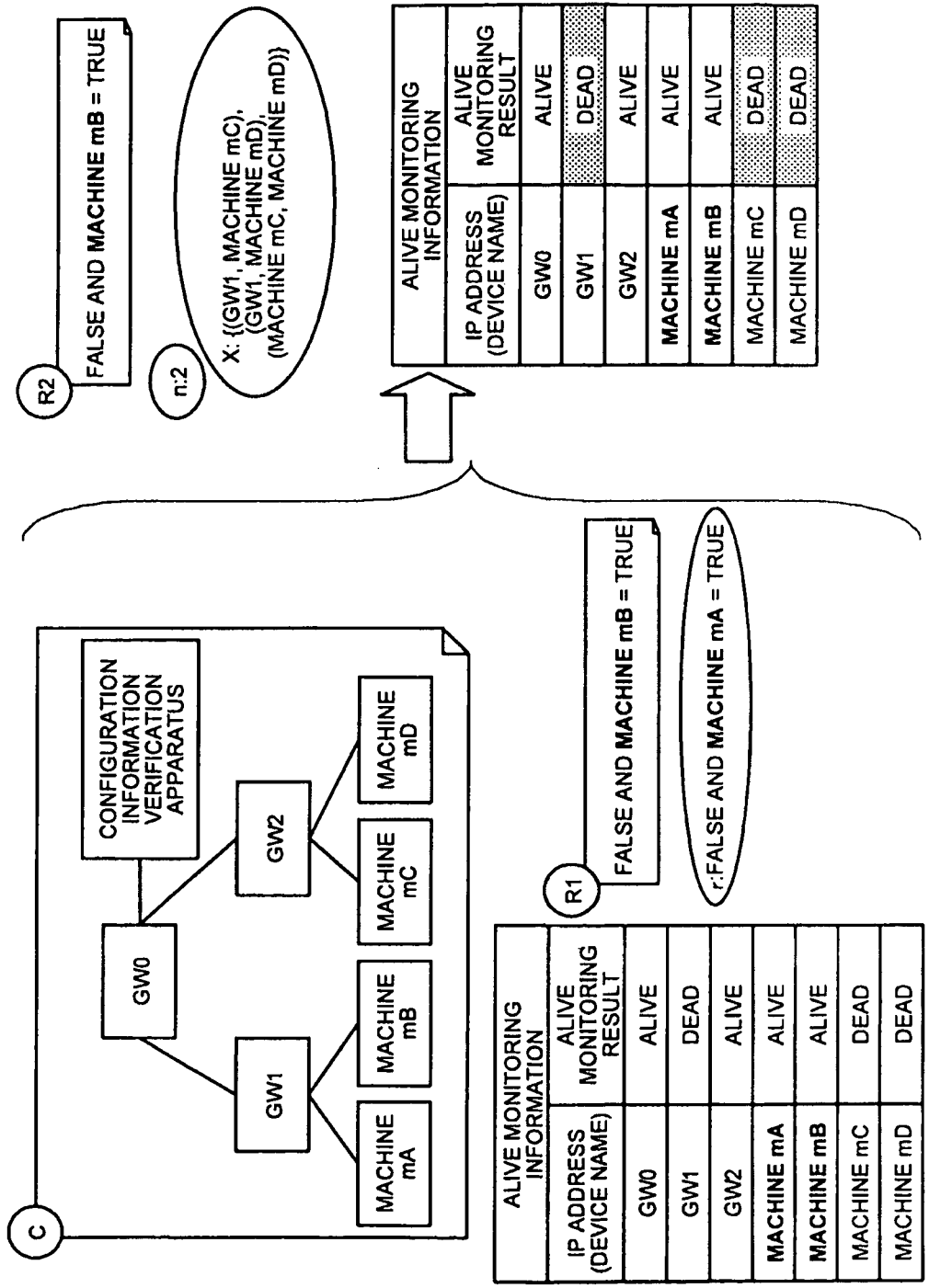
FIG. 27 is a first explanatory diagram for explaining the mechanism of obtaining prospective correct configuration information according to the second embodiment.
Figure 28:
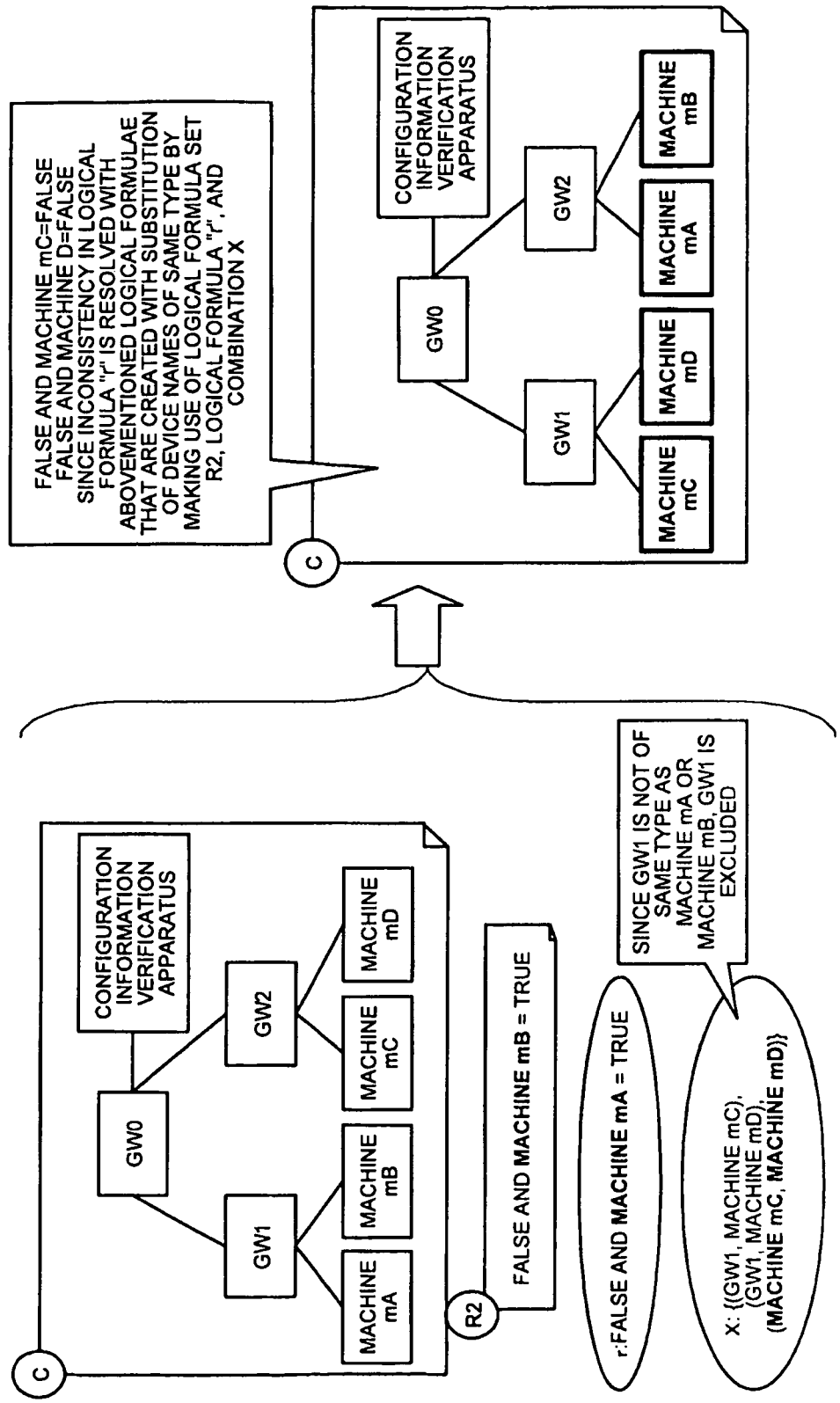
FIG. 28 is a second explanatory diagram for explaining the mechanism of obtaining the prospective correct configuration information according to the second embodiment.

In the example illustrated in FIG. 27, the logical formula inconsistency resolving unit 24 retrieves "false AND machine mA=true" as the logical formula "r" from the logical formula set R1. Therefore, only the logical formula "false AND machine mB=true" remains in the logical formula set R1.

The logical formula "r" has the "true" value. Hence, from the logical formula set R1, the logical formula inconsistency resolving unit 24 obtains the logical formula set R2 having the "true" value. Consequently, the logical formula set R2 happens to include the logical formula "false AND machine mB=true".

Since two device names, namely, the machine mA and the machine mB are present in the logical formula "r" and the logical formula set R2, respectively; the number "n" is equal to two. Subsequently, the logical formula inconsistency resolving unit 24 obtains, from the alive monitoring information, the combination X of n number of device names for which the alive monitoring result indicates "dead". In the example illustrated in FIG. 27, the device names for which the alive monitoring result indicates "dead" are the gateway GW1, the machine mC, and the machine mD. Hence, the combination X is obtained as follows:

X: {(GW1, machine mC),
 (GW1, machine mD),
 (machine mC, machine MD)}.

Herein, the gateway GW1 is not of the same type as the machine mA or the machine mB. Thus, as illustrated in the example in FIG. 28, the logical formula inconsistency resolving unit 24 selects "(machine mC, machine mD)" from among the combination X, and replaces the machine mA and the machine mB specified in the logical formula "r" and the logical formula set R2, respectively, with the machine mC and the machine mD selected from the combination X, and also changes the value of the inconsistent logical formulae from "true" to "false".

As a result of the replacement, following logical formulae are obtained.

false AND machine mC=false
false AND machine mD=false

Hence, the inconsistency in the logical formula "r" is resolved. In this case, the logical formula inconsistency resolving unit 24 updates the configuration information C by replacing the machine mA and the machine mB with the machine mC and the machine mD, respectively, in the configuration information C and sets the configuration information C as the prospective correct configuration information.

As described above, the configuration information verification apparatus 12 according to the second embodiment creates a logical formula corresponding to the route leading to each configuration item by referring to the configuration information 33 and sets the values of the logical formulae based on the alive monitoring information obtained from the network 31. When any inconsistency is found to be present in the logical formulae, the configuration information verification apparatus 12 obtains prospective configuration information that can resolve the inconsistency.

In this way, based on the alive monitoring information that does not require authentication or administration qualification, the configuration information verification apparatus 12 can easily confirm whether the configuration information is consistent with the actual network configuration and can propose the prospective correct configuration information.

Moreover, the configuration information verification apparatus 12 performs an operation of substituting the values of logical formulae having independent configuration items, from among the plurality of logical formulae, into other logical formulae, and determines whether the logical formulae obtained as a result of that operation are inconsistent. Thus, the configuration information verification apparatus 12 can determine whether inconsistency is present by performing a simple operation.

Furthermore, regarding a configuration item that can be reached, via a plurality of routes, the configuration information verification apparatus 12 creates a plurality of logical formulae by performing an AND operation on the configuration items positioned on each route leading to that particular configuration item and then obtains a single logical formula for that particular configuration item by performing an OR operation on the plurality of logical formulae. Hence, even regarding the configuration items that can be reached via a plurality of routes, the configuration information verification apparatus 12 can determine whether inconsistency is present.

Besides, regarding an inconsistent logical formula having the "false" value, the configuration information verification apparatus 12 determines whether the inconsistency can be resolved by replacing the configuration items in that logical formula with the configuration items of the same type that are indicated to be operating normally by the alive monitoring information. In contrast, regarding an inconsistent logical formula having the "true" value, the configuration information verification apparatus 12 determines whether the inconsistency can be resolved by replacing the configuration items in that logical formula with the configuration items of the same type that are not indicated to be operating normally by the alive monitoring information. Thus, by performing simple operations, the configuration information verification apparatus 12 can obtain the prospective configuration information that can resolve the inconsistency.

Meanwhile, the configuration and the operations described in the second embodiment are only exemplary and the second embodiment can be implemented by making appropriate modifications. For example, the second embodiment can be implemented in the form of a configuration information verification program that is executed in a computer.

Figure 29:
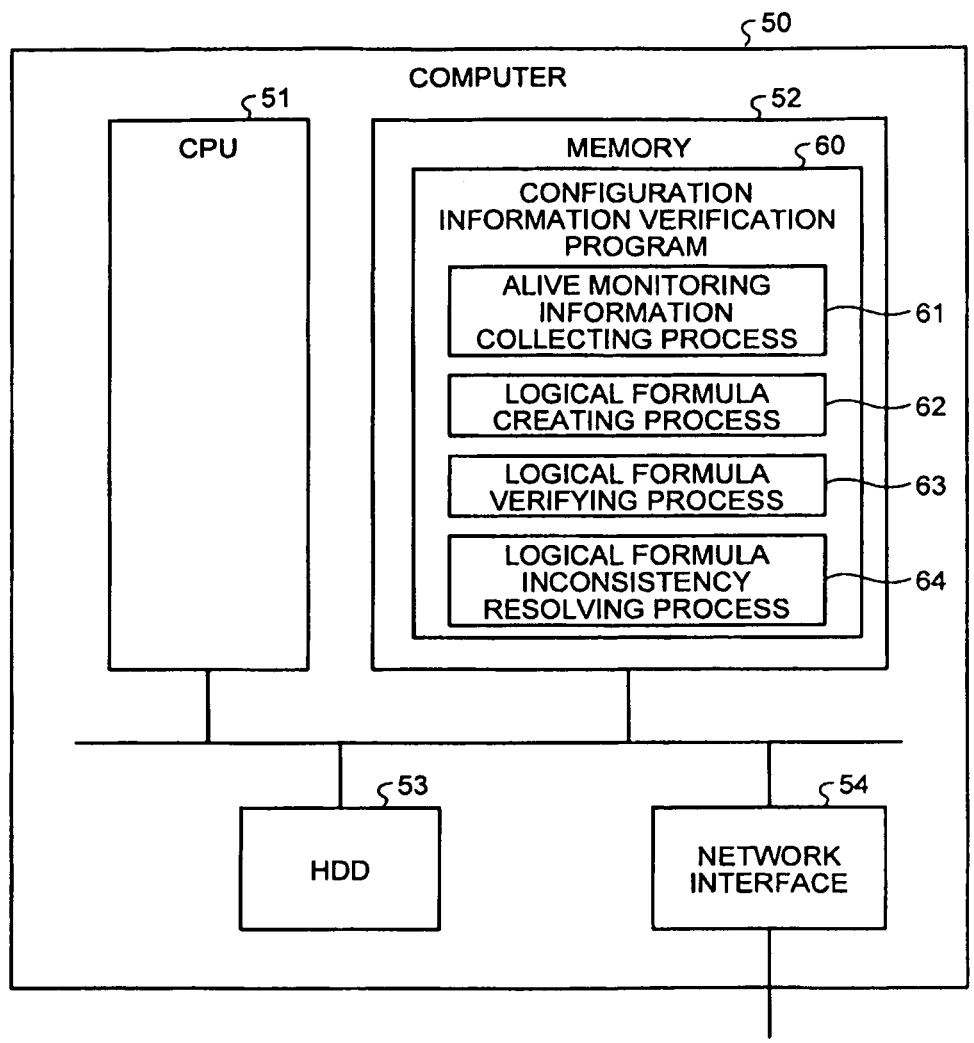
FIG. 29 is an explanatory diagram for explaining a configuration information verification program according to the second embodiment.

FIG. 29 is an explanatory diagram for explaining a configuration information verification program 60. Herein, in a computer 50, the configuration information verification program 60 is loaded in a memory 52 and is executed by a central processing unit (CPU) 51.

Moreover, the configuration information verification program 60 includes an alive monitoring information collecting process 61, a logical formula creating process 62, a logical formula verifying process 63, and a logical formula inconsistency resolving process 64. When executed by the CPU 51, the alive monitoring information collecting process 61 implements identical operations to those implemented by the alive monitoring information collecting unit 21 in the configuration information verification apparatus 12. Similarly, when executed by the CPU 51, the logical formula creating process 62 implements identical operations to those implemented by the logical formula creating unit 22 in the configuration information verification apparatus 12. Moreover, when executed by the CPU 51, the logical formula verifying process 63 implements identical operations to those implemented by the logical formula verifying unit 23 in the configuration information verification apparatus 12. Furthermore, when executed by the CPU 51, the logical formula inconsistency resolving process 64 implements identical operations to those implemented by the logical formula inconsistency resolving unit 24 in the configuration information verification apparatus 12.

Meanwhile, the configuration information verification program 60 can access a network via a network interface 54 and can obtain the alive monitoring information or the configuration information from the network. Besides, the configuration information verification program 60 can be stored in a nonvolatile recording medium such as a hard disk drive (HDD) 53.

[c] Third Embodiment

Figure 30:
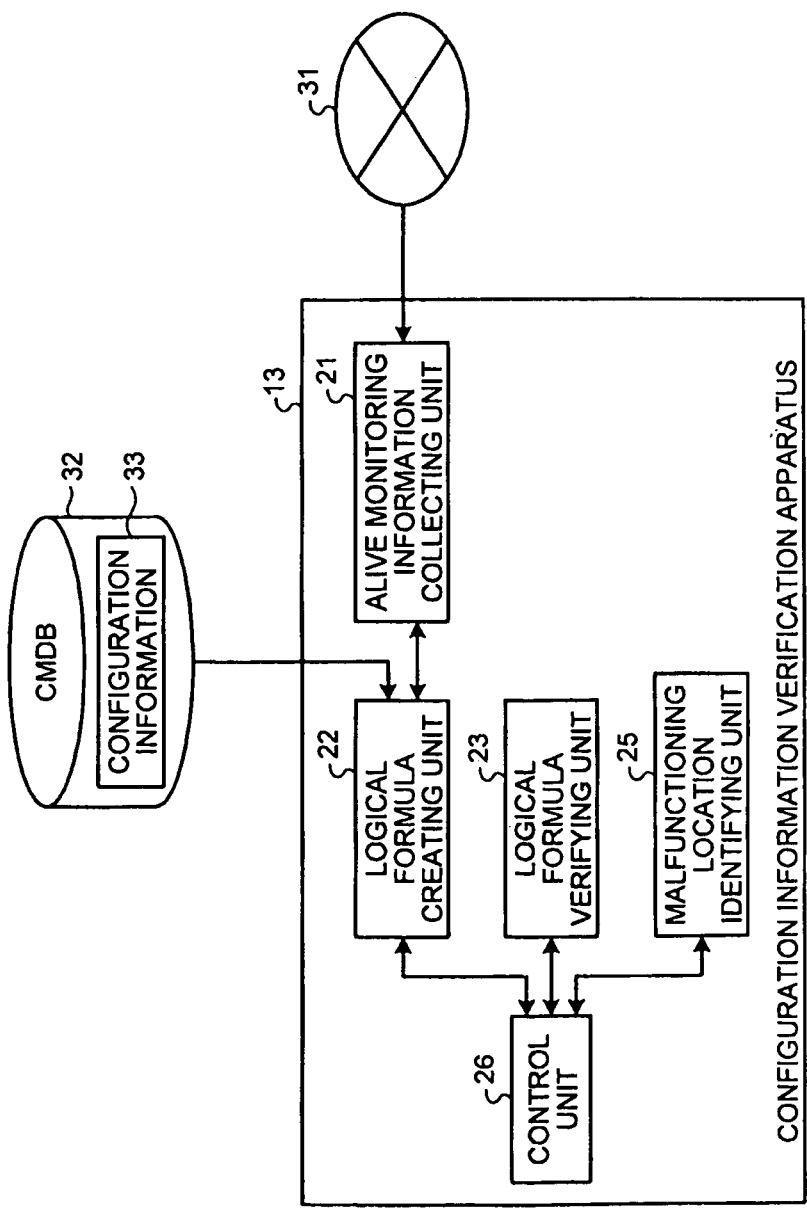
FIG. 30 is an outline configuration diagram of a configuration information verification apparatus according to a third embodiment of the present invention.

FIG. 30 is an outline configuration diagram of a configuration information verification apparatus 13 according to a third embodiment of the present invention. As illustrated in FIG. 30, the configuration information verification apparatus 13 is connected to the network 31 and the CMDB 32. Herein, the CMDB 32 is used to hold the configuration information 33 that represents information about configuration items of the network 31 and about connection relationships between those configuration items.

The configuration information verification apparatus 13 includes a control unit 26, the alive monitoring information collecting unit 21, the logical formula creating unit 22, the logical formula verifying unit 23, and a malfunctioning location identifying unit 25. The control unit 26 controls the operations of the configuration information verification apparatus 13.

More particularly, the control unit 26 instructs the logical formula creating unit 22 to create logical formulae and sends those logical formulae to the logical formula verifying unit 23. Besides, the control unit 26 instructs the malfunctioning location identifying unit 25 to identify malfunctioning locations using the verification result of the logical formulae.

Meanwhile, the operations of the alive monitoring information collecting unit 21, the logical formula creating unit 22, and the logical formula verifying unit 23 are identical to those described in the second embodiment. Hence, the explanation thereof is not repeated. The malfunctioning location identifying unit 25 identifies malfunctioning locations by making use of not only the output from the logical formula verifying unit 23 but also the configuration information and the alive monitoring information.

Figure 31:
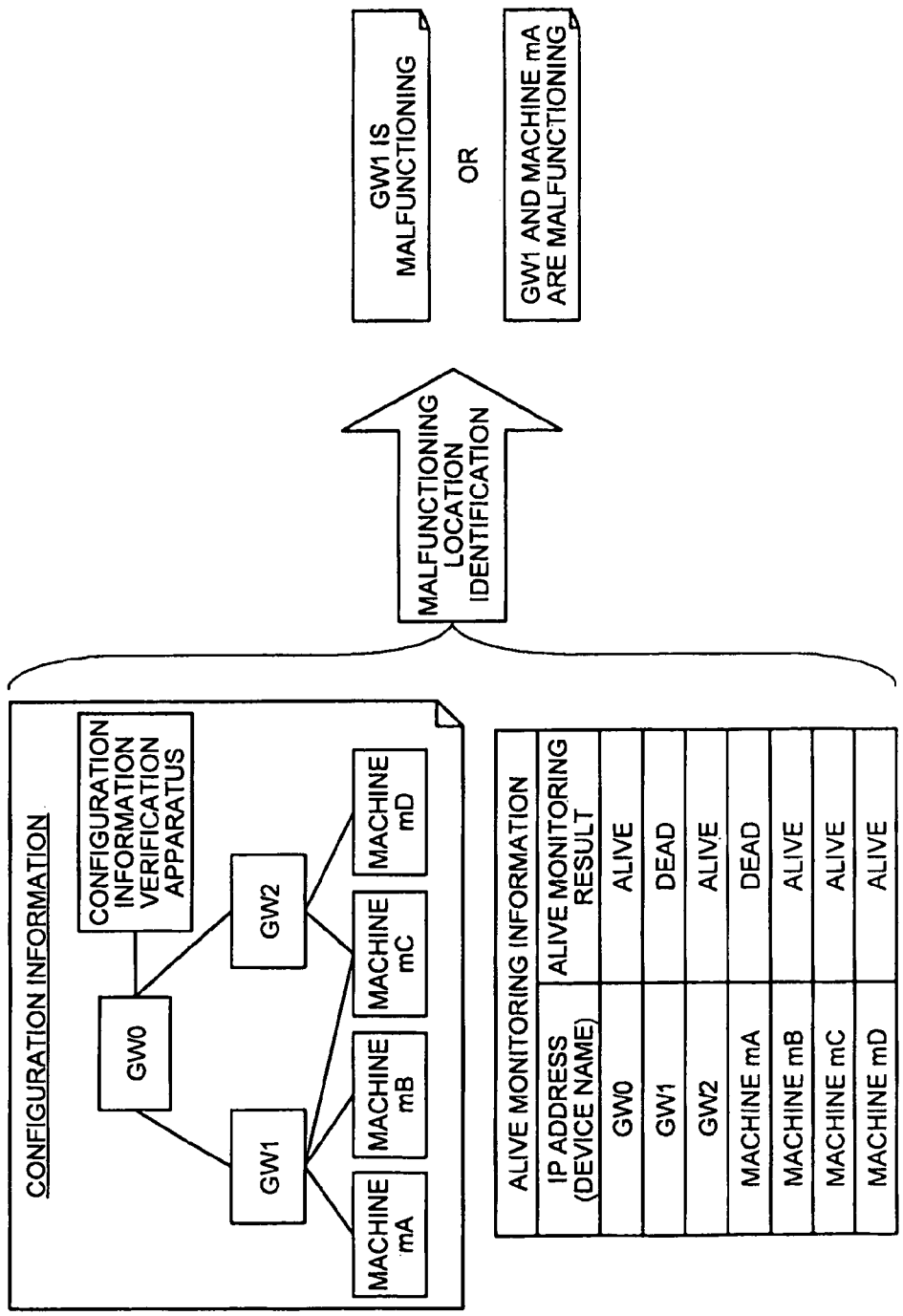
FIG. 31 is an explanatory diagram for explaining malfunctioning location identification performed by a malfunctioning location identifying unit according to the third embodiment.

FIG. 31 is an explanatory diagram for explaining malfunctioning location identification performed by the malfunctioning location identifying unit 25. In the example illustrated in FIG. 31, the configuration information indicates that the gateways GW1 and GW2 are connected to the gateway GW0; indicates that the machines mA and mB are connected to the gateway GW1; and indicates that the machines mB, mC, and mD are connected to the gateway GW2. This configuration information is consistent with the configuration of the network 31.

Moreover, in the example illustrated in FIG. 31, in the alive monitoring information, "alive" is assigned as the alive monitoring result of the gateway GW0, the gateway GW2, the machine mB, the machine mC, and the machine mD; while "dead" is assigned as the alive monitoring result of the gateway GW1 and the machine mA. The malfunctioning location identifying unit 25 makes use of such information and either identifies that the gateway GW1 is malfunctioning or identifies that the gateway GW1 and the machine mA are malfunctioning.

Figure 32:
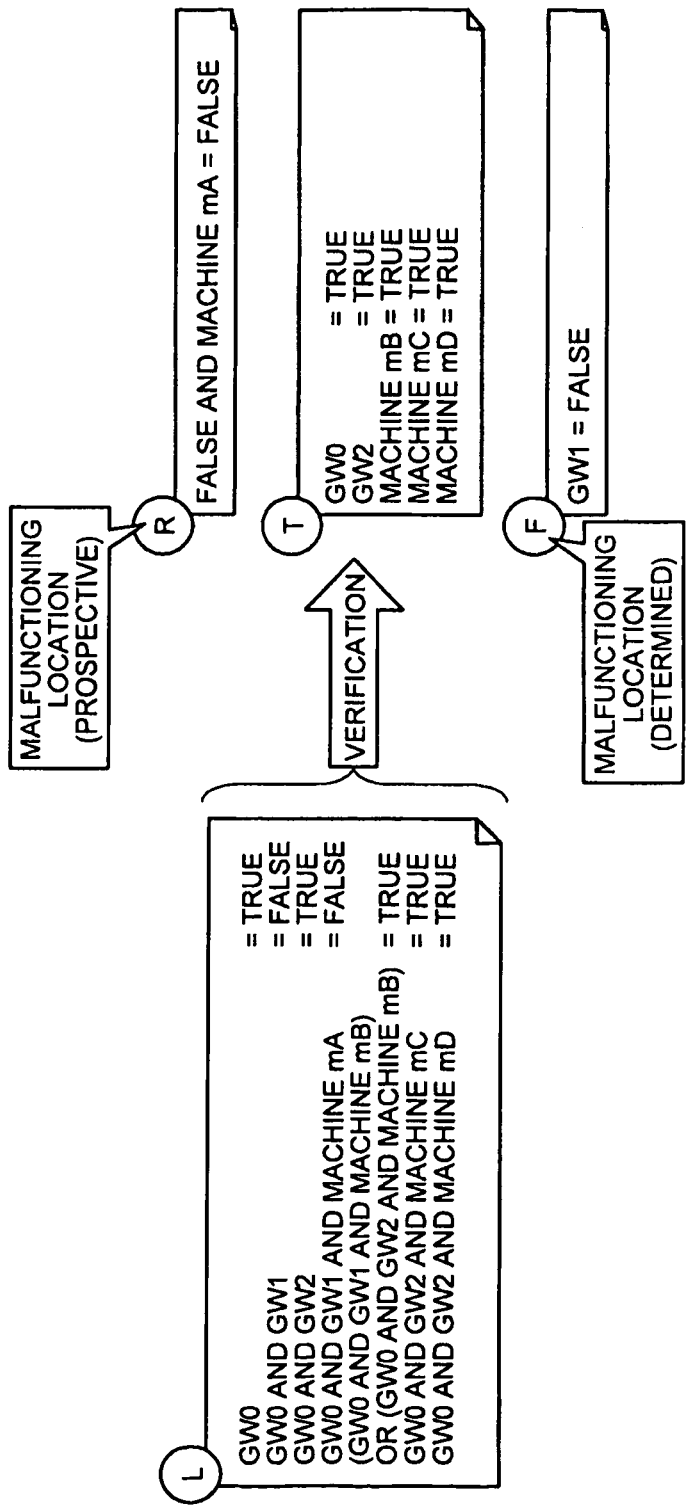
FIG. 32 is an explanatory diagram for explaining the mechanism of malfunctioning location identification performed by the malfunctioning location identifying unit according to the third embodiment.

FIG. 32 is an explanatory diagram for explaining the mechanism of malfunctioning location identification performed by the malfunctioning location identifying unit 25. The logical formula set L created by the logical formula creating unit 22 includes the following logical formulae.

GW0=true
GW0 AND GW1=false
GW0 AND GW2=true
GW0 AND GW1 AND machine mA=false
(GW0 AND GW1 AND machine mB)
   OR (GW0 AND GW2 AND machine mB)=true
GW0 AND GW2 AND machine mC=true
GW0 AND GW2 AND machine mD=true When the logical formula verifying unit 23 verifies the logical formula set L, the logical formula "false AND machine mA=false" is included in the logical formula set R that cannot be subjected to further calculation.

Moreover, the valid formula set T includes the following logical formulae.

GW0=true
GW2=true
machine mB=true
machine mC=true
machine mD=true

Furthermore, the inconsistent formula set F includes the following logical formula: GW1=false.

By referring to the inconsistent formula set F, it can be identified that the GW1 is malfunctioning. In addition, by referring to the logical formula that is included in the logical formula set R, which cannot be subjected to further calculation, and that is not inconsistent; the possibility is suggested that the machine mA may be malfunctioning.

As described above, the configuration information verification apparatus 13 according to the third embodiment creates as well as verifies the logical formulae by referring to the configuration information that is consistent with the configuration of the network 31 and by referring to the alive monitoring information. As a result, the configuration information verification apparatus 13 can identify the malfunctioning locations by referring to the logical formulae included in the inconsistent formula set and can identify the possibly malfunctioning locations by referring to the logical formulae that cannot be subjected to further calculation and that are not inconsistent.

When an inconsistent logical formula is included in the logical formula set R that cannot be subjected to further calculation, it means that the configuration information is inconsistent with the configuration of the network. In such a case, it is desirable to output the fact that the configuration information is inconsistent. Besides, in the third embodiment, by additionally disposing a logical formula inconsistency resolving unit identical to the second embodiment, it also becomes possible to obtain the prospective correct configuration information.

Thus, according to an aspect of the present invention, a configuration information verification apparatus, a configuration information verification method, and a configuration information verification program can be provided that make it possible to easily verify whether the configuration information is consistent with the actual network configuration.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A configuration information verification apparatus, executed by a processor, comprising:
   an alive monitoring information collecting unit for collecting alive monitoring information from a plurality of configuration items constituting a network;
   a logical formula creating unit for referring to configuration information that represents information about connection relationships between the configuration items of the network and creating a logical formula with respect to each configuration item by performing an AND operation on configuration items positioned on a route leading to a selected one of the configuration items, and assigning a "true" value to the configuration item positioned on the route if the alive monitoring information indicates that the configuration item on the route is operating normally and assigning a "false" value to the configuration item positioned on the route if the alive monitoring information indicates that the configuration item on the route is not operating normally; and a logical formula verifying unit for verifying, from a plurality of logical formulae created by the logical formula creating unit with respect to the plurality of configuration items, whether an inconsistent logical formula is present.

2. The configuration information verification apparatus according to claim 1, wherein, the logical formula verifying unit performs an operation of substituting a value of a logical formula which includes a single configuration item, from among the plurality of logical formulae, into other logical formulae and determines whether the logical formulae obtained as a result of the operation are inconsistent.

3. The configuration information verification apparatus according to claim 1, wherein, when a particular configuration item can be reached via a plurality of routes, the logical formula creating unit creates a plurality of logical formulae by performing an AND operation on configuration items positioned on each route leading to the particular configuration item and then creates a logical formula of the particular configuration item by performing an OR operation on the plurality of logical formulae.

4. The configuration information verification apparatus according to claim 1, further comprising a logical formula inconsistency resolving unit for resolving, when the inconsistent logical formula is present, inconsistency by modifying connection relationships of configuration items included in the inconsistent logical formula.

5. The configuration information verification apparatus according to claim 4, wherein, when the inconsistent logical formula has the "false" value, the logical formula inconsistency resolving unit determines that inconsistency is resolved by replacing configuration items in the inconsistent logical formula with configuration items of same type that are indicated to be operating normally by the alive monitoring information, and when the inconsistent logical formula has the "true" value, the logical formula inconsistency resolving unit determines that inconsistency is resolved by replacing configuration items in the inconsistent logical formula with configuration items of same type that are not indicated to be operating normally by the alive monitoring information.

6. A configuration information verification method comprising:
collecting alive monitoring information from a plurality of configuration items constituting a network;
referring to configuration information that represents information about connection relationships between the configuration items of the network and creating a logical formula with respect to each configuration item by performing an AND operation on configuration items positioned on a route leading to a selected one of the configuration items, and assigning a "true" value to the configuration item positioned on the route if the alive monitoring information indicates that the configuration item on the route is operating normally and assigning a "false" value to the configuration item positioned on the route if the alive monitoring information indicates that the configuration item on the route is not operating normally; and
verifying, from a plurality of logical formulae created with respect to the plurality of configuration items, whether an inconsistent logical formula is present.

7. A computer readable, non-transitory medium having stored therein a configuration information verification program, the configuration information verification program causing a computer to execute a process comprising:
collecting alive monitoring information from a plurality of configuration items constituting a network;
referring to configuration information that represents information about connection relationships between the configuration items of the network and creating a logical formula with respect to each configuration item by performing an AND operation on configuration items positioned on a route leading to a selected one of the configuration items, and assigning a "true" value to the configuration item positioned on the route if the alive monitoring information indicates that the configuration item on the route is operating normally and assigning a "false" value to the configuration item positioned on the route if the alive monitoring information indicates that the configuration item on the route is not operating normally; and
verifying, from a plurality of logical formulae created with respect to the plurality of configuration items, whether an inconsistent logical formula is present.

* * * * *